United States Patent
Gavlak et al.

(10) Patent No.: US 12,332,921 B1
(45) Date of Patent: Jun. 17, 2025

(54) SYSTEMS AND METHODS FOR A GRAPH DATABASE

(71) Applicant: The PNC Financial Services Group, Inc, Pittsburgh, PA (US)

(72) Inventors: Heather Marie Gavlak, Delaware, OH (US); Richard Gregory Barker, Gibsonia, PA (US); Evan Michael Sorger, Berea, OH (US); Kevin William Black, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 0 days.

(21) Appl. No.: 18/381,999

(22) Filed: Oct. 19, 2023

Related U.S. Application Data

(60) Provisional application No. 63/489,143, filed on Mar. 8, 2023.

(51) Int. Cl.
| | |
|---|---|
| *G06F 16/00* | (2019.01) |
| *G06F 16/28* | (2019.01) |
| *G06F 16/901* | (2019.01) |
| *G06N 20/00* | (2019.01) |

(52) U.S. Cl.
CPC .......... *G06F 16/288* (2019.01); *G06F 16/285* (2019.01); *G06F 16/9024* (2019.01); *G06N 20/00* (2019.01)

(58) Field of Classification Search
CPC .. G06F 16/288; G06F 16/285; G06F 16/9024; G06N 20/00
See application file for complete search history.

(56) References Cited

U.S. PATENT DOCUMENTS

| | | |
|---|---|---|
| 6,173,270 B1 | 1/2001 | Cristofich et al. |
| 7,171,646 B2 | 1/2007 | Charisius et al. |
| 8,255,403 B2 | 8/2012 | Kenedy et al. |
| 8,347,218 B1 | 1/2013 | Meredith et al. |

(Continued)

FOREIGN PATENT DOCUMENTS

| | | |
|---|---|---|
| AU | 2013245651 A1 | 10/2014 |
| CN | 105808553 A | 7/2016 |

(Continued)

OTHER PUBLICATIONS

Wang, J. "Investors satisfaction with securities analysts' information service." 2014 11th International Conference on Service Systems and Service Management (ICSSSM). IEEE, 2014, 6 pages.

(Continued)

*Primary Examiner* — Paul Kim
(74) *Attorney, Agent, or Firm* — Finnegan, Henderson, Farabow, Garrett & Dunner, LLP

(57) ABSTRACT

The present disclosure is directed to a system for maintaining a relational data model for storage in a database. The operations may include generating a data analysis algorithm trained to predict relationships in a data domain according to an architectural framework; access, a graph database that includes nodes and edges as a data model for representing data objects of the data domain according to the architectural framework; query the data objects using a modeling language for the database; and apply the data analysis algorithm to identify patterns in the graph database.

18 Claims, 30 Drawing Sheets

(56) References Cited

U.S. PATENT DOCUMENTS

| | | |
|---|---|---|
| 8,738,514 B2 | 5/2014 | Chan et al. |
| 9,069,733 B1 | 6/2015 | Meredith et al. |
| 9,886,488 B2 | 2/2018 | Miller et al. |
| 10,114,710 B1 | 10/2018 | Singhal et al. |
| 10,387,476 B2 | 8/2019 | Hanis et al. |
| 10,430,462 B2 | 10/2019 | Gianetto et al. |
| 10,430,463 B2 | 10/2019 | Gianetto et al. |
| 10,489,391 B1 | 11/2019 | Tomlin |
| 10,713,258 B2 | 7/2020 | Stetson et al. |
| 2005/0071750 A1 | 3/2005 | Nelson |
| 2005/0138039 A1 | 6/2005 | Hagen |
| 2005/0154976 A1 | 7/2005 | Nelson |
| 2006/0265699 A1 | 11/2006 | Ali et al. |
| 2007/0192223 A1 | 8/2007 | Cifrese et al. |
| 2007/0192343 A1 | 8/2007 | Faerber et al. |
| 2008/0127049 A1 | 5/2008 | Elaasar |
| 2008/0215621 A1 | 9/2008 | Ravindran et al. |
| 2008/0230600 A1 | 9/2008 | Black et al. |
| 2010/0070947 A1 | 3/2010 | Hille-Doering |
| 2010/0179847 A1 | 7/2010 | Cope et al. |
| 2010/0275179 A1 | 10/2010 | Mengusoglu et al. |
| 2011/0125828 A1 | 5/2011 | Aghara et al. |
| 2012/0110488 A1 | 5/2012 | Brunswg |
| 2012/0166246 A1 | 6/2012 | Simon |
| 2012/0198415 A1 | 8/2012 | Brandt |
| 2013/0091131 A1 | 4/2013 | Szymanski et al. |
| 2013/0110496 A1 | 5/2013 | Heidasch |
| 2013/0204894 A1 | 8/2013 | Faith et al. |
| 2013/0227143 A1 | 8/2013 | Stevens |
| 2013/0290226 A1 | 10/2013 | Dokken |
| 2014/0351116 A1 | 11/2014 | Hoff |
| 2015/0205880 A1 | 7/2015 | Perry et al. |
| 2015/0379445 A1 | 12/2015 | Wang et al. |
| 2017/0147705 A1 | 5/2017 | Kasperovics et al. |
| 2017/0220964 A1 | 8/2017 | Datta Ray |
| 2017/0351819 A1* | 12/2017 | Yamamoto ............ G06F 16/285 |
| 2018/0089291 A1 | 3/2018 | Vankamamidi et al. |
| 2018/0218447 A1 | 8/2018 | Bhattacharjee et al. |
| 2019/0052549 A1 | 2/2019 | Duggal et al. |
| 2019/0171438 A1 | 6/2019 | Franchitti |
| 2019/0310840 A1 | 10/2019 | Dufresne et al. |
| 2019/0318282 A1 | 10/2019 | Patel et al. |
| 2020/0012886 A1 | 1/2020 | Walters et al. |
| 2020/0110776 A1 | 4/2020 | Pollard |
| 2020/0280564 A1 | 9/2020 | Badawy et al. |
| 2020/0364662 A1 | 11/2020 | Avery, Jr. et al. |
| 2021/0020301 A1 | 1/2021 | Dalio et al. |
| 2021/0117908 A1 | 4/2021 | Coles et al. |
| 2021/0398163 A1 | 12/2021 | Nelsen |
| 2022/0156667 A1 | 5/2022 | Bellenguez |
| 2022/0342932 A1 | 10/2022 | Monk et al. |
| 2023/0120826 A1 | 4/2023 | Amiri Modghadam et al. |
| 2023/0179489 A1 | 6/2023 | Latapie et al. |
| 2023/0196063 A1 | 6/2023 | Latapie et al. |
| 2023/0214398 A1 | 7/2023 | Kazmierczak et al. |
| 2023/0298325 A1 | 9/2023 | Malur Srinivasan et al. |
| 2024/0070163 A1 | 2/2024 | Parks et al. |
| 2024/0078244 A1 | 3/2024 | Moresmau et al. |
| 2024/0121125 A1 | 4/2024 | Blair et al. |
| 2024/0168999 A1* | 5/2024 | Nefedov ............ G06F 16/9024 |
| 2024/0256552 A1 | 8/2024 | Lincourt, Jr. et al. |
| 2024/0297897 A1* | 9/2024 | Elton ...................... G06F 21/10 |

FOREIGN PATENT DOCUMENTS

| | | | |
|---|---|---|---|
| WO | WO 2012/068433 A1 | 5/2012 | |
| WO | WO 2015/048814 A1 | 4/2015 | |
| WO | WO 2016/130547 A1 | 8/2016 | |
| WO | 2016159819 A1 | 10/2016 | |
| WO | WO 2020/047550 A1 | 3/2020 | |

OTHER PUBLICATIONS

Ori et al. "Analysing Strategic Alignment Problems Using Inter-domain Matches of Enterprise Architecture Models." Advances in Enterprise Engineering XIII: 9th Enterprise Engineering Working Conference, EEWC 2019, Lisbon, Portugal, May 20-24, 2019, pp. 135-146.

Kaul, Ashish. "Visualized Architecture Knowledge Management Collaboration Services." (2009). (Year:2009).

* cited by examiner

DATA DOMAINS 201

| DOMAINS | DATA VELOCITY |
|---|---|
| Accounts | Low |
| Transactions | Medium |
| Positions | Medium |
| Contacts | Low |
| Tax Lots | Medium |
| Prices | High |
| Securities | Medium |
| Performance | Medium |
| Analytics | Medium |
| Allocations | Medium |
| Investment Strategy | Low |

*FIG. 2*

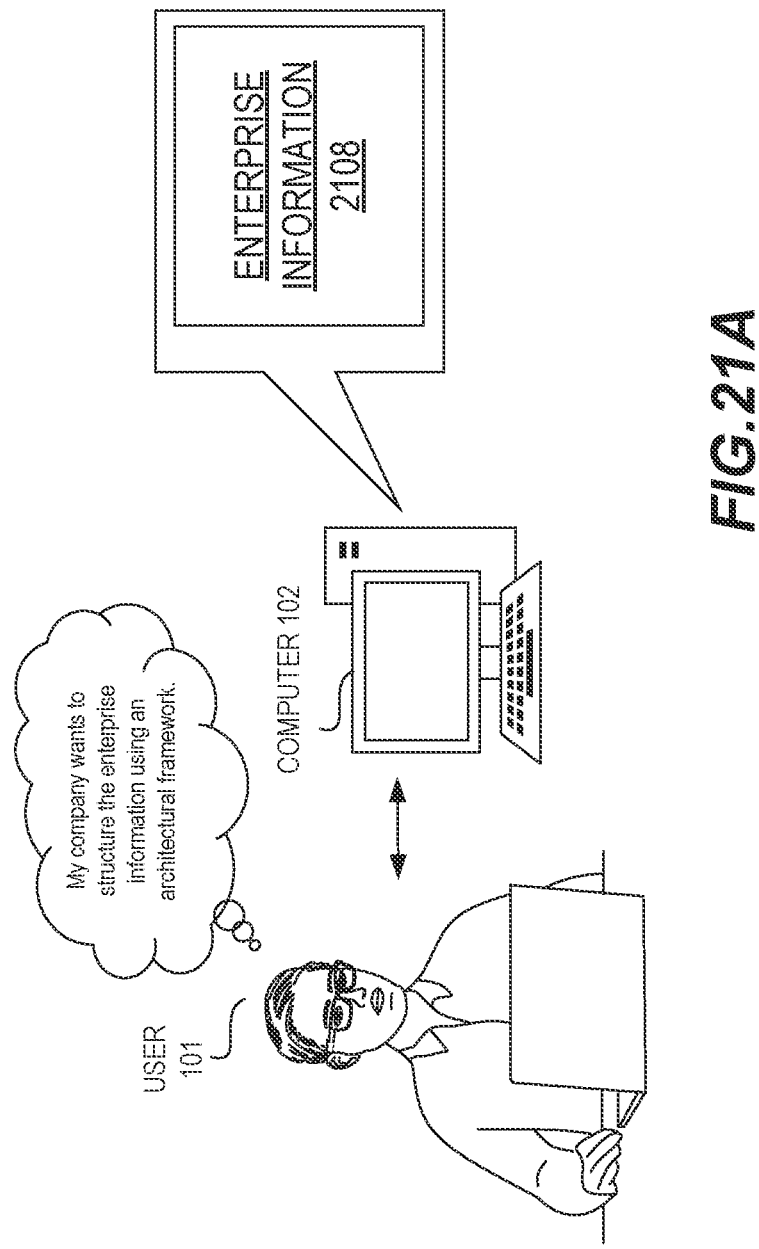

| DOMAIN | Ownership | Data Source |
|---|---|---|
| Strategy | Federated to LOB's | Disparate Documentation |
| Business | Federated to LOB's | Disparate Documentation |
| Data | MIS managed | Data Documentation via EDS |
| Application | MIS managed | ARIS, ServiceNow, Troux, Disparate Documentation |
| Technology | ET&S | ARIS, Troux |

FIG. 23

SYSTEMS AND METHODS FOR A GRAPH DATABASE

CROSS-REFERENCE TO RELATED APPLICATIONS

The present application claims priority to Provisional U.S. Patent Application Ser. No. 63/489,143, filed Mar. 8, 2023, the disclosure of which is incorporated herein by reference.

TECHNICAL FIELD

The present disclosure relates generally to systems and methods for a graph database.

BACKGROUND

Metamodels are mainly used to facilitate conceptual modeling, define constructs of conceptual modeling languages, specify constraints on the use of constructs, and to encode the similarities of different models. Currently, there is no meta-model that is formally documented and recognized by current enterprise technology, where such technology may streamline workflows, improve communication, and/or provide access to data. As a result, much of enterprise information currently is not organized according to a standard structure, so that, from an enterprise perspective, business organizations, including financial institutions, are currently unable to relate technology information (and metadata) to business and strategy information.

SUMMARY

One aspect of the present disclosure is directed to a system for categorizing data in or more domains for storage in a database. The system may include at least one processor; and at least one memory configured to execute the instructions to perform operations. The operations may include receiving the one or more data domains from a source system, wherein each of the one or more data domains is configured to be distributed between one or more applications and each of the data domains is categorized according to a logical grouping of the data domains based on instruments within the source system for storage within the database; store the categorized data for each of the or more data domains within the database; and further categorize each of the one or more data domains as having a data velocity selected from a range of data velocities, each representative of a frequency with which data of the data domain changes.

Another aspect of the present disclosure is directed to a method for categorizing data in or more domains for storage in a database. The method may perform operations including receiving the one or more data domains from a source system, wherein each of the one or more data domains is configured to be distributed between one or more applications and each of the data domains is categorized according to a logical grouping of the data domains based on instruments within the source system for storage within the database; store the categorized data for each of the or more data domains within the database; and further categorize each of the one or more data domains as having a data velocity selected from a range of data velocities, each representative of a frequency with which data of the data domain changes.

Yet another aspect of the present disclosure is directed to a non-transitory computer-readable medium. The non-transitory computer readable medium may perform a method for categorizing data in or more domains for storage in a database. The method may perform operations including receiving the one or more data domains from a source system, wherein each of the one or more data domains is configured to be distributed between one or more applications and each of the data domains is categorized according to a logical grouping of the data domains based on instruments within the source system for storage within the database; store the categorized data for each of the or more data domains within the database; and further categorize each of the one or more data domains as having a data velocity selected from a range of data velocities, each representative of a frequency with which data of the data domain changes.

One aspect of the present disclosure is directed to a system for maintaining a relational data model for storage in a database. The system may include at least one processor; and at least one memory configured to execute the instructions to perform operations. The operations may include generating, using a machine learning model, a data analysis algorithm trained to predict relationships in a data domain according to an architectural framework; access, a graph database that includes nodes and edges as a data model for representing data objects of the data domain according to the architectural framework, the nodes being configured to store first-class entities and the edges being configured to store relationships between the first-class entities; store individual data objects of the data domain within the database according to relationships between the first-class entities in the data domain, the relationships containing of architectural properties of the architectural framework, for an instance of querying, the querying including searching for applications within the data domain; query the data objects using a modeling language for the database; and apply the data analysis algorithm to identify patterns in the graph database.

Another aspect of the present disclosure is directed to a method for maintaining a relational data model for storage in a database. The method may perform operations including generating, using a machine learning model, a data analysis algorithm trained to predict relationships in a data domain according to an architectural framework; accessing, a graph database that includes nodes and edges as a data model for representing data objects of the data domain according to the architectural framework, the nodes being configured to store first-class entities and the edges being configured to store relationships between the first-class entities; storing, individual data objects of the data domain within the database according to relationships between the first-class entities in the data domain, the relationships containing of architectural properties of the architectural framework, for an instance of querying, the querying including searching for applications within the data domain; querying, the data objects using a modeling language for the database; and applying, the data analysis algorithm to identify patterns in the graph database.

One aspect of the present disclosure is directed to a system for analyzing nodes and data labels for storage in a database. The system may include at least one processor; and at least one memory configured to execute the instructions to perform operations. The operations may include generating, a plurality of nodes according to an architectural meta-model for a database; providing, meta-data associated with a data object stored by the generated plurality of nodes from the architectural meta-model for the database; grouping, the generated plurality of nodes into at least one or more sets, the sets including ones of the generated nodes that contain the same data label corresponding to the same set for the data object; and storing, properties of the architectural meta-model that include name-value pairs of data for use on the generated plurality of nodes or one or more relationships.

Another aspect of the present disclosure is directed to a method for analyzing nodes and data labels for storage in a database. The method may perform operations including generating, a plurality of nodes according to an architectural meta-model for a database; providing, meta-data associated with a data object stored by the generated plurality of nodes from the architectural meta-model for the database; grouping, the generated plurality of nodes into at least one or more sets, the sets including ones of the generated nodes that contain the same data label corresponding to the same set for the data object; and storing, properties of the architectural meta-model that include name-value pairs of data for use on the generated plurality of nodes or one or more relationships.

One aspect of the present disclosure is directed to a system for applying a metamodel of a graph database. The system may include at least one processor; and at least one memory configured to execute the instructions to perform operations. The operations may include categorizing, architectural information across one or more data domains according an architectural framework; constructing rules, constraints, and relationships corresponding to the data domains using an architectural meta-model of the architectural framework; analyzing, components of the data domains to derive the architectural information for the one or more data domains; and triggering, an application associated with the architectural meta-model using a process model to identify the constructed rules, constraints, and decisions for the graph database.

Another aspect of the present disclosure is directed to a method for applying a metamodel of a graph database. The method may perform operations including categorizing, architectural information across one or more data domains according an architectural framework; constructing rules, constraints, and relationships corresponding to the data domains using an architectural meta-model of the architectural framework; analyzing, components of the data domains to derive the architectural information for the one or more data domains; and triggering, an application associated with the architectural meta-model using a process model to identify the constructed rules, constraints, and decisions for the graph database.

Yet another aspect of the present disclosure is directed to a non-transitory computer-readable medium. The non-transitory computer readable medium may perform a method for applying a metamodel of a graph database. The method may perform operations including categorizing, architectural information across one or more data domains according an architectural framework; constructing rules, constraints, and relationships corresponding to the data domains using an architectural meta-model of the architectural framework; analyzing, components of the data domains to derive the architectural information for the one or more data domains; and triggering, an application associated with the architectural meta-model using a process model to identify the constructed rules, constraints, and decisions for the graph database.

One aspect of the present disclosure is directed to a system for providing a backlog of architectural information for storage in a database. The system may include at least one processor; and at least one memory configured to execute the instructions to perform operations. The operations may include reporting architectural information corresponding to the graph database; generating the architectural information from one or more data domains, the architectural information being generated based on an architectural dataset within the graph database; and distributing architectural information associated with the data domains, to report insights related to the architectural information via a data visualization software.

Yet another aspect of the present disclosure is directed to a non-transitory computer-readable medium. The non-transitory computer readable medium may perform a method for providing a backlog of architectural information for storage in a database. The method may perform operations including reporting architectural information corresponding to the graph database; generating the architectural information from one or more data domains, the architectural information being generated based on an architectural dataset within the graph database; and distributing architectural information associated with the data domains, to report insights related to the architectural information via a data visualization software.

Yet another aspect of the present disclosure is directed to a method. The method may perform operations including for providing a backlog of architectural information for storage in a database. The method may perform operations including reporting architectural information corresponding to the graph database; generating the architectural information from one or more data domains, the architectural information being generated based on an architectural dataset within the graph database; and distributing architectural information associated with the data domains, to report insights related to the architectural information via a data visualization software.

One aspect of the present disclosure is directed to a system for organizing architectural information for storage in a database. The system may include at least one processor; and at least one memory configured to execute the instructions to perform operations. The operations may include identify architectural information according to a metamodel utilized by an architectural framework, the architectural framework classifying elements of a modeling language and including at least one or more layers; provide a structured context for the architectural framework, the structured context including the elements of the modeling language for classifying and representing the architectural information within each of one or more data domains; analyze the identified architectural information, the architectural information including the at least one or more layers for modeling object information; utilize a modeling language to express the architectural information about the one or more data domains; and generate the architectural information categorized according to the metamodel, to organize the architectural information for the architectural framework into the one or more data domains.

Yet another aspect of the present disclosure is directed to a method. The method may perform operations for organizing architectural information for storage in a database. The method may perform operations including identifying architectural information according to a metamodel utilized by an architectural framework, the architectural framework classifying elements of a modeling language and including at least one or more layers; providing, a structured context for the architectural framework, the structured context including the elements of the modeling language for classifying and representing the architectural information within each of one or more data domains; analyzing, the identified architectural information, the architectural information including the at least one or more layers for modeling object information; utilizing a modeling language to express the architectural information about the one or more data domains; and generating the architectural information categorized according to the metamodel, to organize the architectural information for the architectural framework into the one or more data domains.

Yet another aspect of the present disclosure is directed to a non-transitory computer-readable medium. The non-transitory computer readable medium may perform a method for organizing architectural information for storage in a database. The method may perform operations including identifying architectural information according to a metamodel utilized by an architectural framework, the architectural framework classifying elements of a modeling language and including at least one or more layers; providing, a structured context for the architectural framework, the structured context including the elements of the modeling language for classifying and representing the architectural information within each of one or more data domains; analyzing, the identified architectural information, the architectural information including the at least one or more layers for modeling object information; utilizing a modeling language to express the architectural information about the one or more data domains; and generating the architectural information categorized according to the metamodel, to organize the architectural information for the architectural framework into the one or more data domains.

One aspect of the present disclosure is directed to a system for grouping architectural information within a plurality of layers for common formatting in a database. The system may include at least one processor; and at least one memory configured to execute the instructions to perform operations. The operations may include group according to the meta-model, architectural datasets together to structure database architectural information into a common format; establish an architectural domain for grouping the database architectural information in a plurality of layers; organize the meta-model to establish possession of information in the plurality of layers; and provide architectural data corresponding to each data domain for each of the plurality of layers from one or more data sources.

Yet another aspect of the present disclosure is directed to a method. The method may perform operations for organizing architectural information for storage in a database. The method may perform operations including grouping according to the meta-model, architectural datasets together to structure database architectural information into a common format; establishing an architectural domain for grouping the database architectural information in a plurality of layers; organizing the meta-model to establish possession of information in the plurality of layers; and providing architectural data corresponding to each data domain for each of the plurality of layers from one or more data sources.

Yet another aspect of the present disclosure is directed to a non-transitory computer-readable medium. The non-transitory computer readable medium may perform a method for organizing architectural information for storage in a database. The method may perform operations grouping according to the meta-model, architectural datasets together to structure database architectural information into a common format; establishing an architectural domain for grouping the database architectural information in a plurality of layers; organizing the meta-model to establish possession of information in the plurality of layers; and providing architectural data corresponding to each data domain for each of the plurality of layers from one or more data sources.

It is to be understood that both the foregoing general description and the following detailed description are exemplary and explanatory only and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 2 depicts an exemplary illustration of a table presenting data domains and their corresponding data velocities, consistent with disclosed embodiments.

FIG. 21A depicts an exemplary illustration of a user using a computing device displaying an architectural framework including enterprise information, consistent with disclosed embodiments.

FIG. 23 depicts an exemplary illustration of a table for organizing architectural information for common formatting, consistent with disclosed embodiments;

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added, or steps may be removed without departing from the envisioned embodiments. Thus, the materials, methods, and examples are illustrative only and are not intended to be necessarily limiting.

Embodiments herein include computer-implemented methods, tangible non-transitory computer-readable media, and systems. The computer-implemented methods may be executed, for example, by at least one processor (e.g., a processing device) that receives instructions from a non-transitory computer-readable storage medium. Similarly, systems consistent with the present disclosure may include at least one processor (e.g., a processing device) and a memory, and the memory may include a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, compact disc (CD) ROMs, digital optical discs (DVDs), flash drives, disks, and/or any other known physical storage medium. Singular terms, such as "memory" and "computer-readable storage medium," may additionally refer to multiple structures, such as a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Data Domains

Figure 1A:
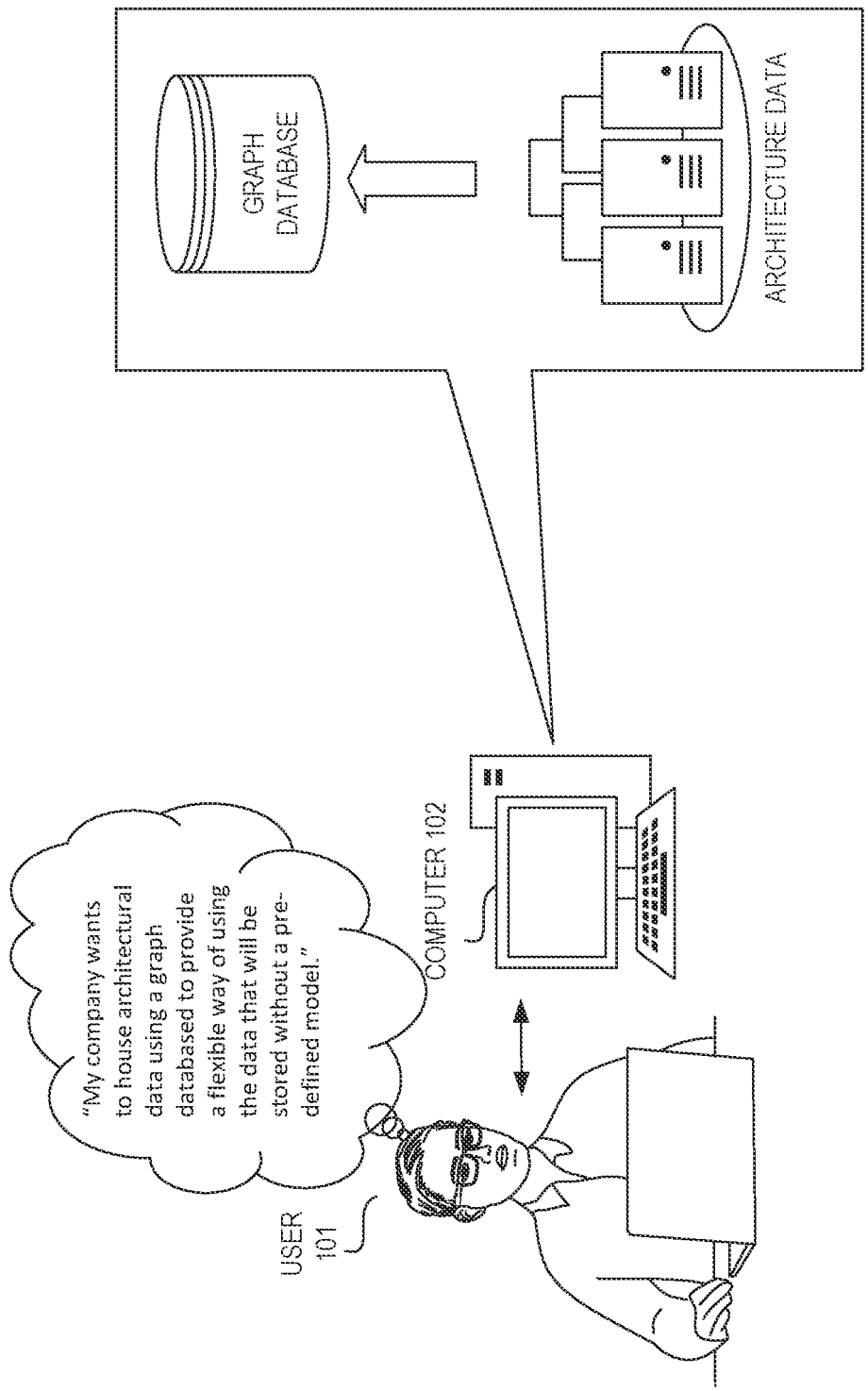
FIG. 1A depicts an exemplary illustration of a user using a computing device displaying an architectural graph database, consistent with disclosed embodiments.

FIG. 1A depicts an exemplary illustration of a user using a computing device displaying an architectural graph database. A user 101 considers: "My company wants to house architectural data using a graph databased to provide a flexible way of using the data that will be stored without a pre-defined model". User 101 then uses a computer 102 to view a graph database that will house architecture data. Architecture data as used herein may refer to data that corresponds to the structure of an organization's logical and physical data assets to reach business objectives for an organization or enterprise.

Figure 1B:
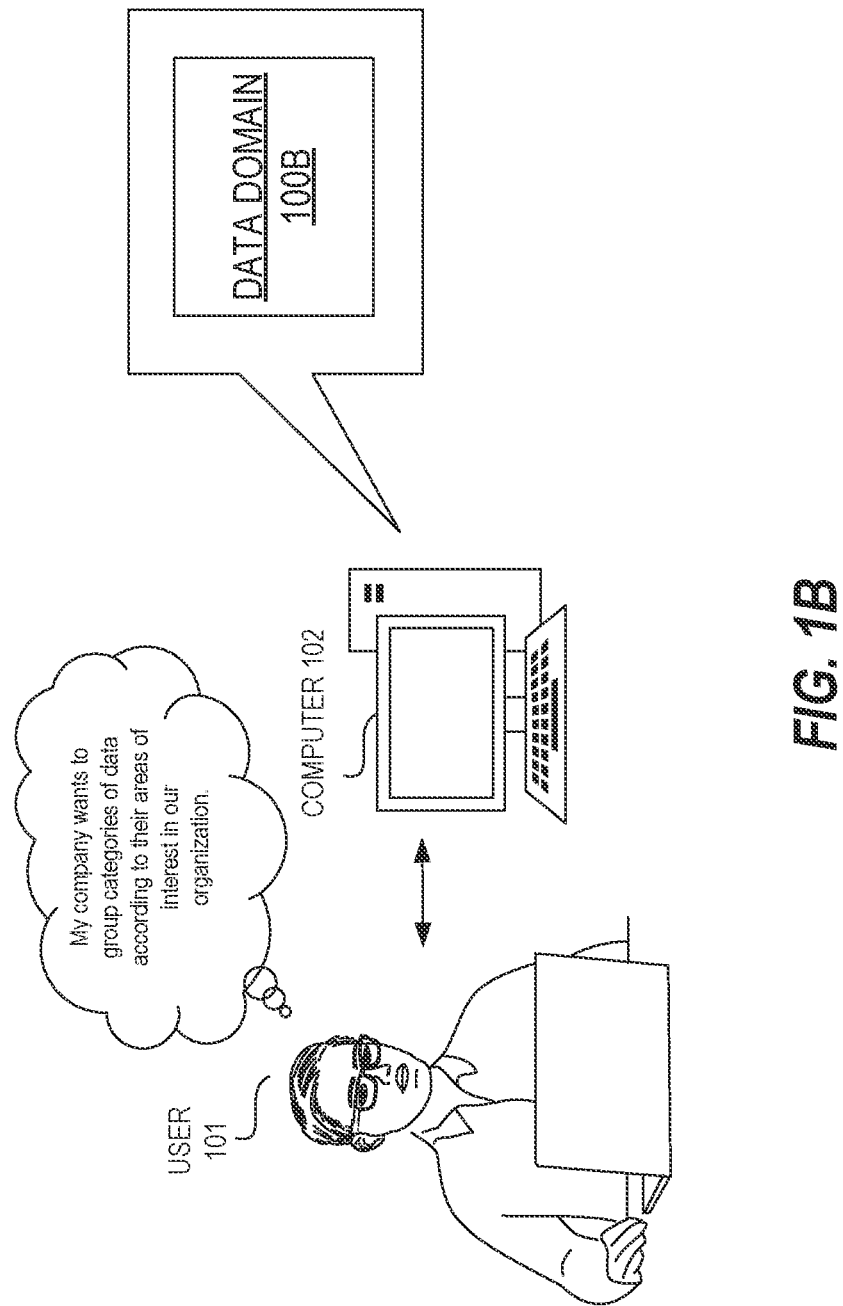
FIG. 1B depicts an exemplary illustration of the user in FIG. 1A using the computing device displaying a data domain in a database, consistent with disclosed embodiments.

FIG. 1B depicts an exemplary illustration 100B of the user in FIG. 1A using a computing device displaying a data domain in a database. Data domains, as used herein, may refer to groupings of data that can be utilized to categorize types of data. User 101 considers: "My company wants to group categories of data according to their areas of interest in our organization". User 101 then uses computer 102 to view a data domain 100B that is a grouping, i.e., category of data, for a database. Data domain 100B provides a comprehensive view of all the distinct types of data that will be stored into one or more data domains. The data within the data domain 100B pertains to different financial services that are offered by a financial institution.

Figure 1C:
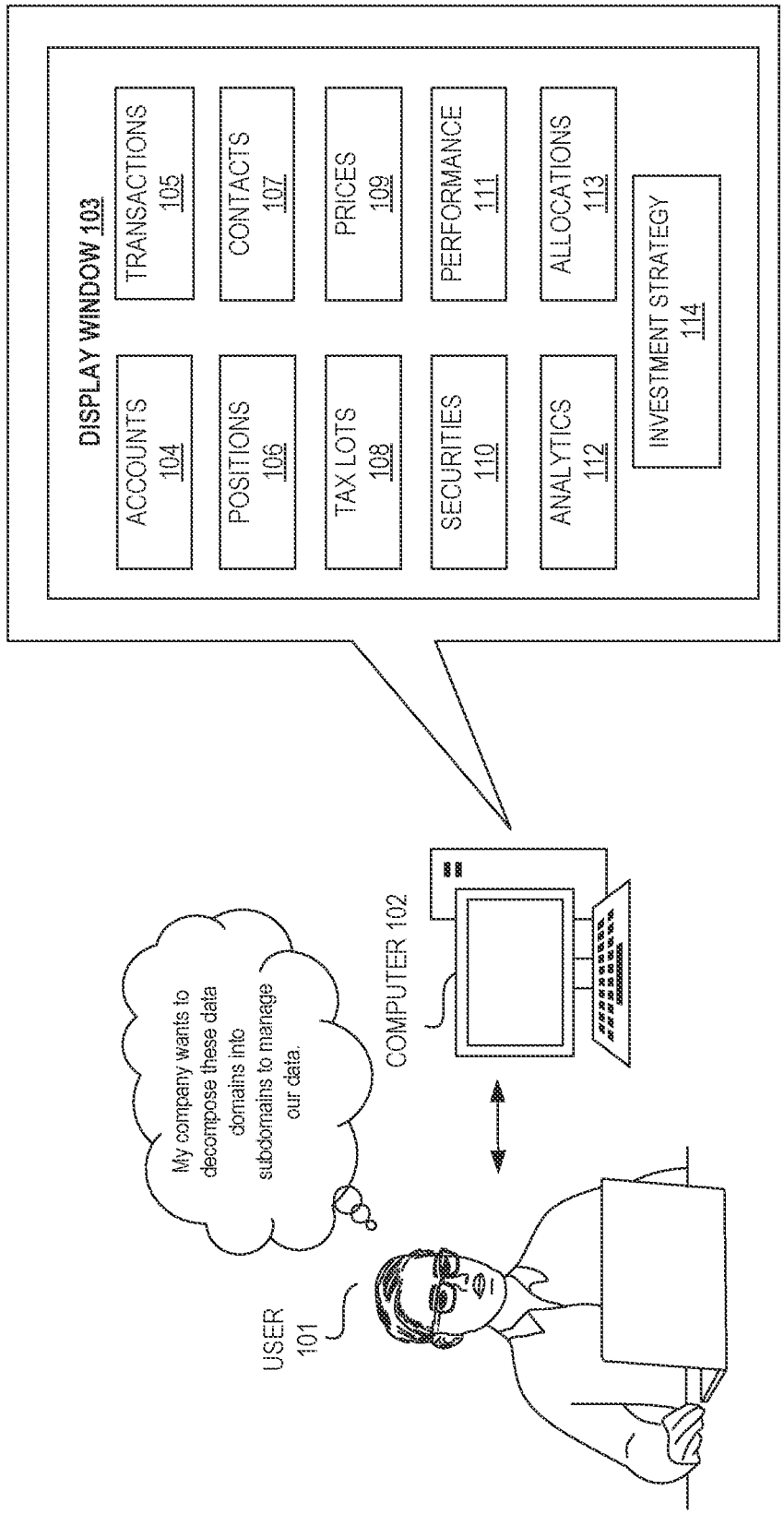
FIG. 1C depicts another exemplary illustration of the user in FIG. 1A using the computing device displaying one or more data domains in the database, consistent with disclosed embodiments.

FIG. 1C depicts an exemplary illustration 100C of the user in FIG. 1B using the computing device displaying one or more data domains in a database. User 101 considers: "My company wants to decompose these data domains into subdomains to manage our data". In the example 100 illustrated in FIG. 1C, user 101 then uses a computer 102 to view displayed information pertaining to an architectural graph database. The architectural graph database or database may refer to a graph database that may house architectural data for an enterprise using the one or more data domains.

A graph database, as used herein, is a database including nodes for storing data and edges representing relationships between the data in the respective nodes, as more fully described below. User 101 opens a display window 103 that displays one or more data domains that are used to categorize the several types of data associated with various domains. These data domains may represent different financial services of a financial institution, including Accounts 104, Transactions 105, Positions 106, Contacts 107, Tax Lots 108, Prices 109, Securities 110, Performance 111, Analytics 112, Allocations 113, and Investment Strategy 114.

Accounts 104 and its attributes determine the rightful owner and beneficiaries of assets held within an account along with how the account and its assets are managed.

Transactions 105 correspond to actions taken in an account to enter or exit (either partial or whole) a position within a security. Position as used herein may refer to the amount of collateral or security, currency and commodity being owned by a dealer, individual, institution, or any other financial institution. Security as used herein may refer to financial instruments that hold value and can be traded between parties. When the security is sold, the proceeds may then go into cash. Most accounts associated with the transaction contain a "sweep" feature that invests funds into a smaller investment such as a money market.

Positions 106 comprise an account and its attributes that are either entered or existed (either partial or whole) through transactions 105 and include relevant information such as the quantity owned and the current value of each transaction. Attributes as used herein may refer to a particular property of an object. For example, this may include attributes such as an asset class or sector, which may be defined and stored within a source system. The sum of the value of all positions within an account including cash, will equal the total account value.

Contacts 107 comprise users having an interest in an account such as the owners, beneficiaries, accountants, etc. Contacts 107 include a "One-to-many-relationship" between Accounts 104 and Contacts 107. A one-to-many relationship as used herein may refer to when a single entity is associated with any number of other entities.

Tax lots 108 comprise quantities of the same asset that are purchased at various points of time, (e.g., months, years, days, etc.). Tax lots 108 are distinguished by the date and quantity purchased. There are multiple disposition methods associated with tax lots 108 such as excessive cost, average cost, and first-in-first-out. Disposition as used herein may refer to the disposal of assets or securities through assignment, sale, or another transfer method.

Prices 109 represent the value of a security for a single unit (such as a share of stock, mutual fund, bond, or ETF). For most widely traded securities, prices change constantly during normal market hours. Prices 109 represent how illiquid or low volume securities may change much less. Normally, end of day prices is used to value accounts as of previous day close and this is the value reflect on statements as of the last trading day of the closing period. Typically, the closing price of a security can be retrieved for any given market day as well as the most current intraday market price.

Securities 110 defined in an investment accounting system are collectively and commonly referred to as the Security Master. Securities 110 are used by accounts to establish positions. If an account establishes a position in a security that is not yet defined in the Security Master, then it must be created. The Security Master within the system contains many attributes for each security that make it unique such as CUSIP, Ticker, Maturity Date, Asset Class, Sector, Industry, Dividend Yield, and many more. Regardless of which accounts own positions in these securities, the Security Master defines attributes which apply throughout the system. It is noted that securities may sometimes be referred to as Assets. Accordingly, the Security Master may sometimes be referred to as an Asset Master Performance 111 represents a measure of the return on investment for a given time period (i.e., YTD, QTD, MTD, 1 Yr., 1 Month, etc.). Additionally, performance 111 can be measured at various levels within an account or group of accounts (i.e., Account Level, Asset Class Level, Sector Level, Security Level). Performance is impacted by changes in the price of a security combined with the income it produces (i.e., dividends, interest).

Analytics 112 is a broad category that covers all aspects of data analytics in all areas that may impact investment decisions. Examples of such areas include client holding (both absolute and relative to various overlays), client performance (both absolute and relative to various benchmarks), investment risks and opportunities, responsible investing, economics, geopolitics, interest rates and other factors.

Allocations 113 are typically measured as a percent of how much of a single position or combined positions are in relation to a variety of areas within a portfolio and/or an investment model. For example, the total value of a position at a given point in time can be measured as a percentage of the total value for a portfolio, a single account, or within a particular Asset Class contained in a portfolio (i.e., as a portion of Equities). An example of measuring combined positions would be summing all Fixed Income positions in a portfolio to measure the total Fixed Income asset class allocation in relation to that portfolio. Viewing allocations 113 at various levels within a portfolio allows for the understanding and management of risk and return. This is typically a cornerstone to investment strategy and analysis.

Investment Strategy 114 relates to information that is compiled to represent an investing strategy that could be implemented and tracked on various levels (e.g., asset class allocations vs, specific investment allocations). This includes investment models—often including stated allocations—and written qualitative positions. Formulated Investment Strategies act as guides for investing client assets with the intention of meeting their goals while adhering to their risk/return profiles.

FIG. 2 depicts an exemplary illustration of a table 200 presenting data domains 201 and their corresponding data velocities, as displayed on computer 102. Disclosed embodiments may involve categorizing data in one or more domains for storage in a database. Categorizing as used herein: may refer to the grouping data based on shared characteristics or attributes in a data domain. Further to the description of FIG. 1, data domain refers to the logical grouping of items of interest to an organization or areas of interest within the organization. Data domains may be viewed as high-level categories of data for the purpose of assigning certain characteristics for the data. For example, data domains 201 may be utilized to categorize types of data distributed between applications. In order to categorize data according to the logical grouping of the data domains, the data is grouped together based on their attributes or attributes' relationships, as defined above for the differing types of data domains such as Accounts 104, Transactions 105, Positions 106, Contacts 107, Tax Lots 108, Prices 109, Securities 110, Performance 111, Analytics 112, Allocations 113, and Investment Strategy 114, as defined in FIG. 1.

In some embodiments, the one or more data domains may be received from a source system. Each of the one or more data domains are configured to be distributed between one or more applications and each of the data domains are categorized according to a logical grouping of the data domains based on instruments within the source system for storage within the database. As used herein, source system may refer to the data sources on which the data warehouse is based. The data warehouse may correspond to an architectural graph data base that contains pertinent information for the data domains. For example, the data warehouse may play a role in the way the data domains are distributed. Through the usage of data warehousing to distribute the data in the data domains, the data from the source system may be integrated into the data warehouse.

In some embodiments, the data of each of the one or more data domains includes content associated with a profile of a user for determining whether the user is an established user and beneficiary of instruments included within the profile. Content as used herein may refer to pertinent information or relevant data present within a dataset. The content represents pertinent information that can be extracted, analyzed, and used to derive insights. For example, in FIG. 2, data domains 201 within the database may include information relating to the user's name, age, home address, or other relevant data that differentiates the data domains for a profile of a user, and which may refer to the account associated with the user.

The user profile includes of a collection of information associated with the individual data domains in data domains 201, that characterizes the specific user. For example, this may include details associated with demographics, user preferences, user behaviors, or any additional information that would provide additional insight for each data domain. The established user, as used herein, may refer to a user who has been the authorized user of their account. Numerous criteria can be established for determining an established user and may include the date at which the account was created, frequency of usage for the account, along with an engagement level associated with the account. A beneficiary of instruments as used herein may refer to a person or entity designated to receive benefits, rights, or funds from an instrument, which can include an insurance policy, will, trust or any other legal document that outlines the distribution of assets or benefits for a user. An instrument can be viewed as a tangible document or a digital record that defines the terms and conditions of an agreement.

In some embodiments, the data of each of the one or more data domains includes content associated with a security master containing attributes for at least one or more instruments stored in the database. As described above with reference to FIG. 1, a security master may refer to securities that are defined in an investment account system. Attributes as used herein may refer to the properties associated with nodes or edges in a graph database. A node represents entities associated with the graph database while the edges represent relationships between those entities. Attributes are used to provide additional information regarding the entities and relationships, which assists with querying and analyzing data associated with the graph database. For example, in FIG. 2, the domains in data domains 201 include two important relationships: the nodes represent one or more users, and the edges represent the relationship between the users. The attributes for the user may include the individual information for each data domain in FIG. 1, as described above.

In some embodiments, the data of each of the one or more data domains includes content associated with information relating to a user profile of a user during a period. Information as used herein may refer to information for the data domains 201 in the graph database, which depends on specific use cases and the entities and relationships that are being modeled within the graph database. For example, the information relating to a user profile of a user may contain pertinent information in the data domains 201 that includes user profiles, and details regarding the domains (e.g., transactions, quantities purchased, contacts, prices, etc.), as described in FIG. 1. A period as used herein may refer to a fixed duration of time. For example, this may include a fixed interval during which financial activities have taken place, time span between events, or any fixed segment of time. For example, performance 111 is a measure of the return on investment. This can be for a given time period such as a return of an investment being measured from Mar. 1, 2023, to Jul. 30, 2023, summarizing the investment performance of an investment for a user profile. The time period may range from YTD (Year to date), QTD (Quarter to date), MTD (Month to date), 1 Yr., or 1 Month.

In some embodiments, the data of each of the one or more data domains includes content associated with architectural analytics for identifying different patterns of user behavior for assessing decisions of a user. Architectural analytics as used herein may refer to the analysis and evaluation of a financial institution's architectural framework. For example, this may include optimizing the design, performance, and scalability of the architectural framework based on data-driven insights. These analytics may assist with identifying different patterns of behavior, which entails identifying recurring behaviors or trends displayed by users when interacting with the graph database. This can include determining how the user typically manages their account along with their respective assets, preferring certain quantities of the same asset purchased at various points of time and changes in price of a security combined with the income it produces.

Analytics 112 in FIG. 2 covers various aspects of data analytic information for that domain that serves to impact a user's investment decisions. As described above with reference to FIG. 1, examples of analytical areas would be client holding, client performance, investment risks and opportunities for a user, responsible investing, economics, geopolitics, interest rates or other factors. Various machine learning algorithms may be implemented by analyzing system logs and performance metrics associated with data domains 201, to detect inconsistencies and predict potential issues in the graph database's architectural framework. This may include anomaly detection algorithms which include an unsupervised data processing technique for detecting anomalies from a dataset.

In some embodiments, the categorized data is divided into distinct categories. The categories of data domains as identified above with respect to FIGS. 1 and 2 have been identified and utilized to categorize types of data distributed between one or more applications. The categorization of that data is retained within the graph database. The data may be categorized by organizing the data into distinct categories as described with reference to FIG. 1 based on common attributes associated with differing financial services or actions from a financial institution. This type of categorization assists with managing the data in data domains 201, and enables efficient retrieval of data, analysis, and decision-making. For example, identifying the scope or boundaries of data domains 201 may involve understanding the specific area for which the data associated with data domains 201 may be categorized.

For example, if the data domain is positions 105, then the categorization may consider important attributes associated with the investment itself such as the asset class, sector, etc. The same can be said for securities 110, where the security master within the system includes attributes for each security within that domain. These attributes serve to represent the uniqueness of the data within securities 110 such as CUSIP, Ticker, Maturity Date, Asset Class, Sector, Industry, Dividend Yield, etc. In some embodiments, the data of each of the one or more data domains include content associated with at least one or more records of acquisition of instruments. For example, this may include instruments that refer to the documentation and data relating to obtaining a financial or legal instrument. These records contain details regarding the instrument, involved parties, terms of an acquisition, and other approvals or authorizations.

In some embodiments, the categorized data may be stored for each of the or more data domains within the database. This includes the source systems that are the sources of data for that data domain. The source systems are the backend applications where the data is originated.

In some embodiments, each of the one or more data domains may be categorized as having a data velocity selected from a range of data velocities, each representative of a frequency with which data of the data domain changes. Data velocity as used herein may refer to the speed with which data is generated, distributed or collected. In some embodiments, the range of data velocities includes individual data velocities in the source system. In this case in FIG. 2, each of the individual data domains have their own respective data velocity. This can be further interpreted as the data domains having differing data velocities according to a range, which may be based on how frequently the data changes within the domain, which correlates with the frequency. In some embodiments, the range of data velocities includes a low data velocity, medium data velocity, and a high data velocity. For example, in FIG. 2, Accounts 104, Contacts 107, and Investment Strategy 114 all have low data velocities, which represents data changing infrequently.

In some embodiments, at least one of the one or more data domains includes user profile data having low data velocity, the low data velocity corresponding to data changes that occurs below a threshold frequency. The threshold frequency can be interpreted as a specific frequency with which the data changes infrequently, which can be hourly, daily, weekly, monthly, yearly. every second, once a minute, twice a year, and other periodic combinations associated with time. Transactions 105, Positions 106, Tax Lots 108, Securities 110, Performance 111, Analytics 112, and Allocations 113 all have medium data velocities. This represents every account being distinct but containing various activities such as rebalancing, investment strategy shifts and cash needs, which will result in changes throughout the course of the year. Allocations 113 changes daily on most occasions due to market price changes. Prices 109 and Analytics 112 represents changes corresponding to when prices shift constantly once financial markets are open. An alternative option of changing data may be using previous day closing prices, which will remain static.

Figure 3:
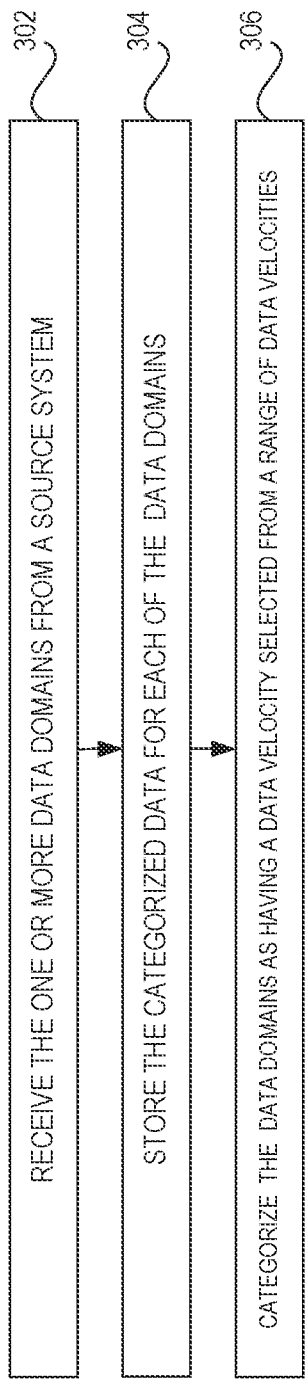
FIG. 3 depicts a flow chart for a method of categorizing data in or more domains, consistent with disclosed embodiments.

FIG. 3 depicts a flow chart for a method 300 of categorizing data in or more domains. Method 300 may include a step 302 of receiving, as explained above with respect to FIG. 2, the one or more data domains from a source system. Method 300 may include a step 304 of storing, as explained above with respect to FIG. 2, the categorized data for each of the data domains. Method 300 may include a step 306 of categorizing, as explained above with respect to FIG. 2, the data domains as having a data velocity selected from a range of data velocities.

Organizational Decomposition

Figure 4A:
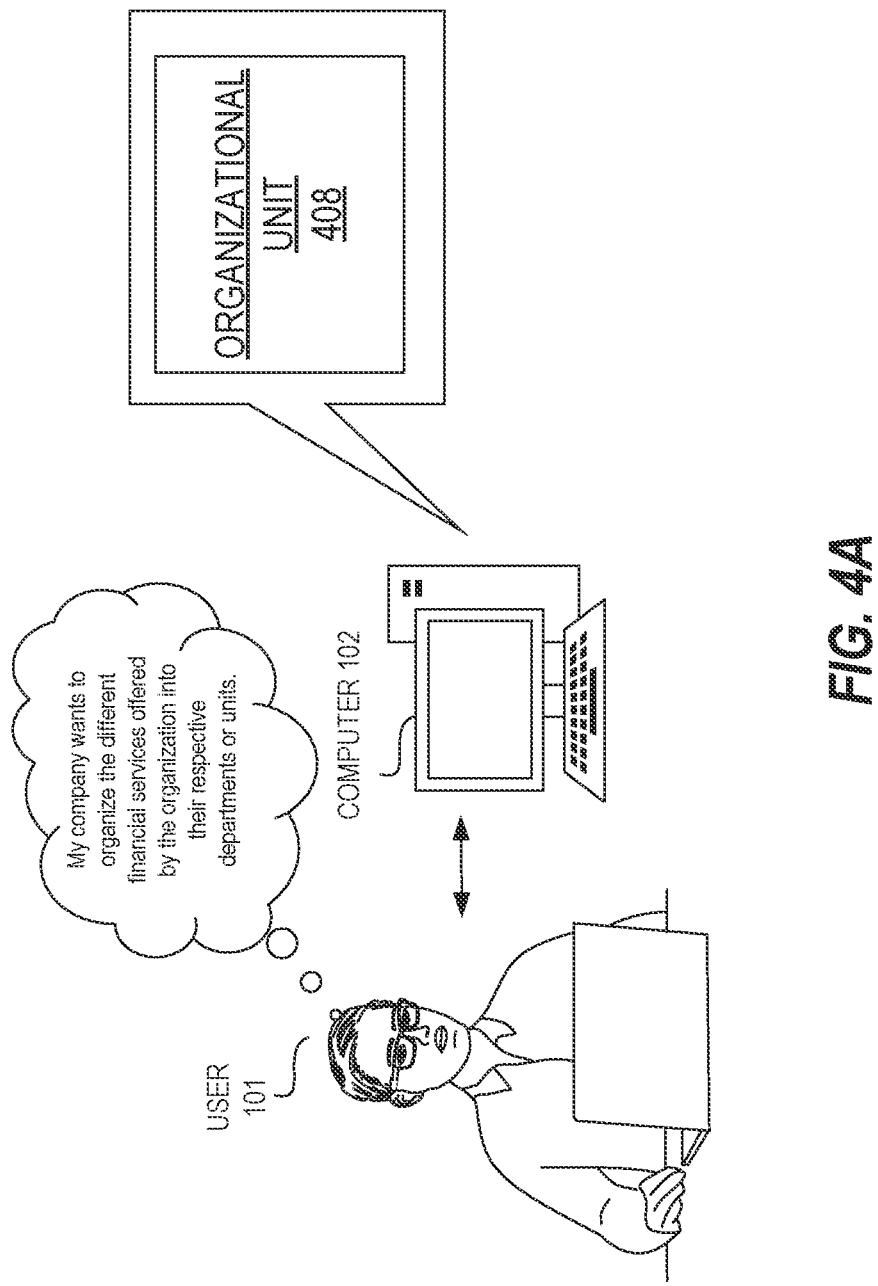
FIG. 4A depicts an exemplary illustration of a user using a computing device displaying a diagram of an organizational unit, consistent with disclosed embodiments.

FIG. 4A depicts an exemplary illustration 400A of a user using a computing device displaying a diagram of an organizational unit. an organizational unit as used herein may refer to a way of classifying information located in a directory. User 101 considers: "My company wants to organize the different financial services offered by the organization into their respective departments or units." User 101 then uses computer 102 to view an organizational unit 408 for a graph database. Organizational unit 408 can represent a single organization with multiple units within the financial institution. These units can be viewed as subdivisions of different financial services that can be offered to the user and can represent the financial institution's organizational or business structure.

Figure 4B:
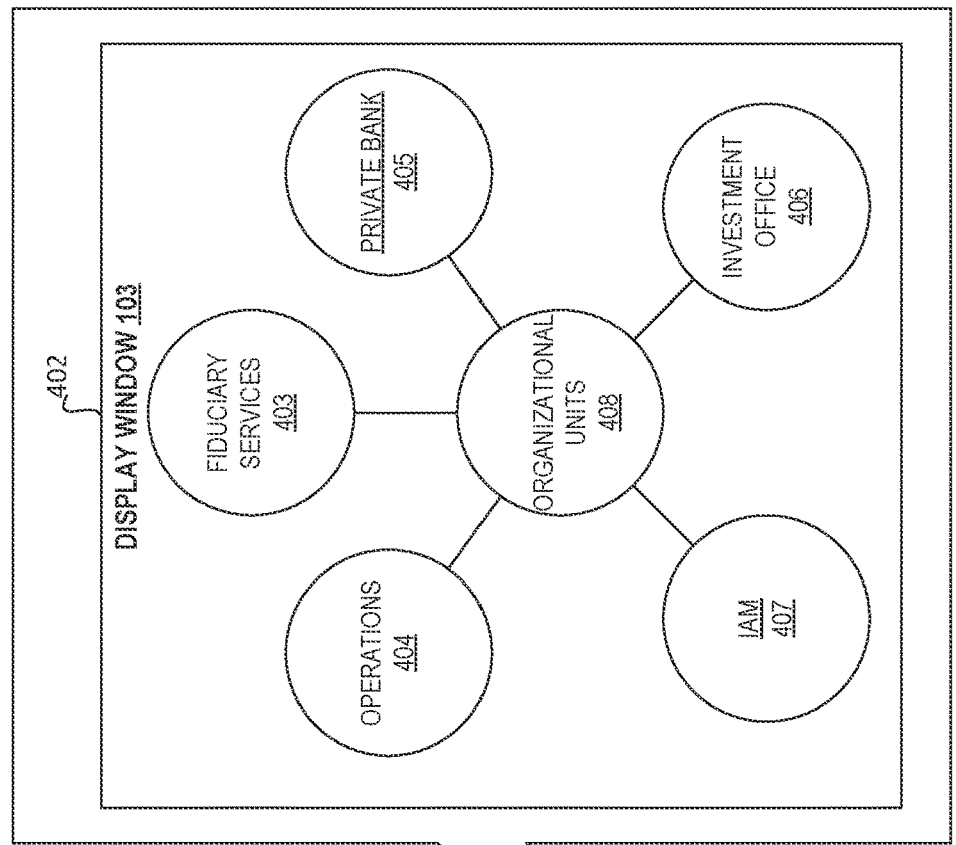
FIG. 4B depicts an exemplary illustration of the user in FIG. 4A using the computing device displaying a diagram of several organizational units, consistent with disclosed embodiments.

FIG. 4B depicts an exemplary illustration 400 of the user in FIG. 4A using the computing device displaying a diagram 402 of one or more organizational units. User 101 considers that: "We've now organized the different financial services into one or more departments or units within our organization". In the example depicted in FIG. 4B, user 101 then uses computer 102 to view information pertaining to an architectural graph database. The architectural graph database refers to a graph database that may house architectural data for an enterprise using the one or more data domains. User 101 opens display window 103, in which user 101 is presented with one or more data domains that are used to categorize the several types of data associated with each domain, as previously described.

With regards to the displayed organizational units, fiduciary services 403 represents various financial services that are provided by a fiduciary, i.e., a person or entity that is legally bound to act in the best of their clients. Operations 404 represent the management of finances and resources within the financial institution. Operations 404 encompasses all aspects of managing financial information of the financial institution. Private bank 405 represents personalized financial services and products offered to account holders of the financial institution. Investment office 406 represent the one or more financial services offered to a user. IAM (Identity Access Management) 407 represent a framework of policies and technologies for ensuring that the appropriate users have the appropriate access to technology resources. Organizational units 408 represent the classification of objects located in one or more directories, or labels within a digital certificate hierarchy, typically used either to differentiate between objects with the same label, or to parcel out authority to create and manage objects.

Figure 4B:
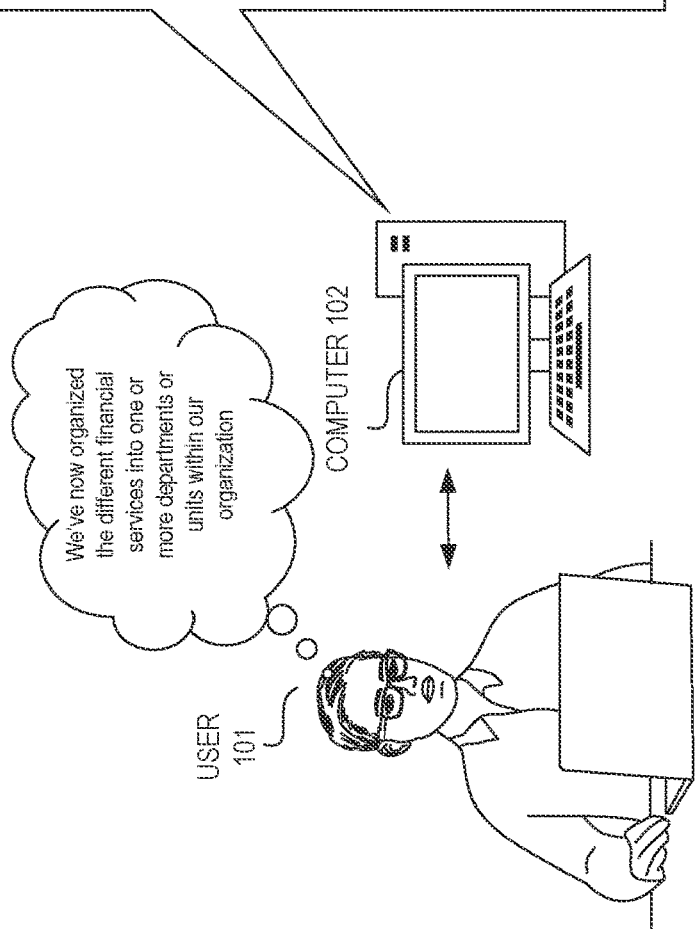
Figure 5:
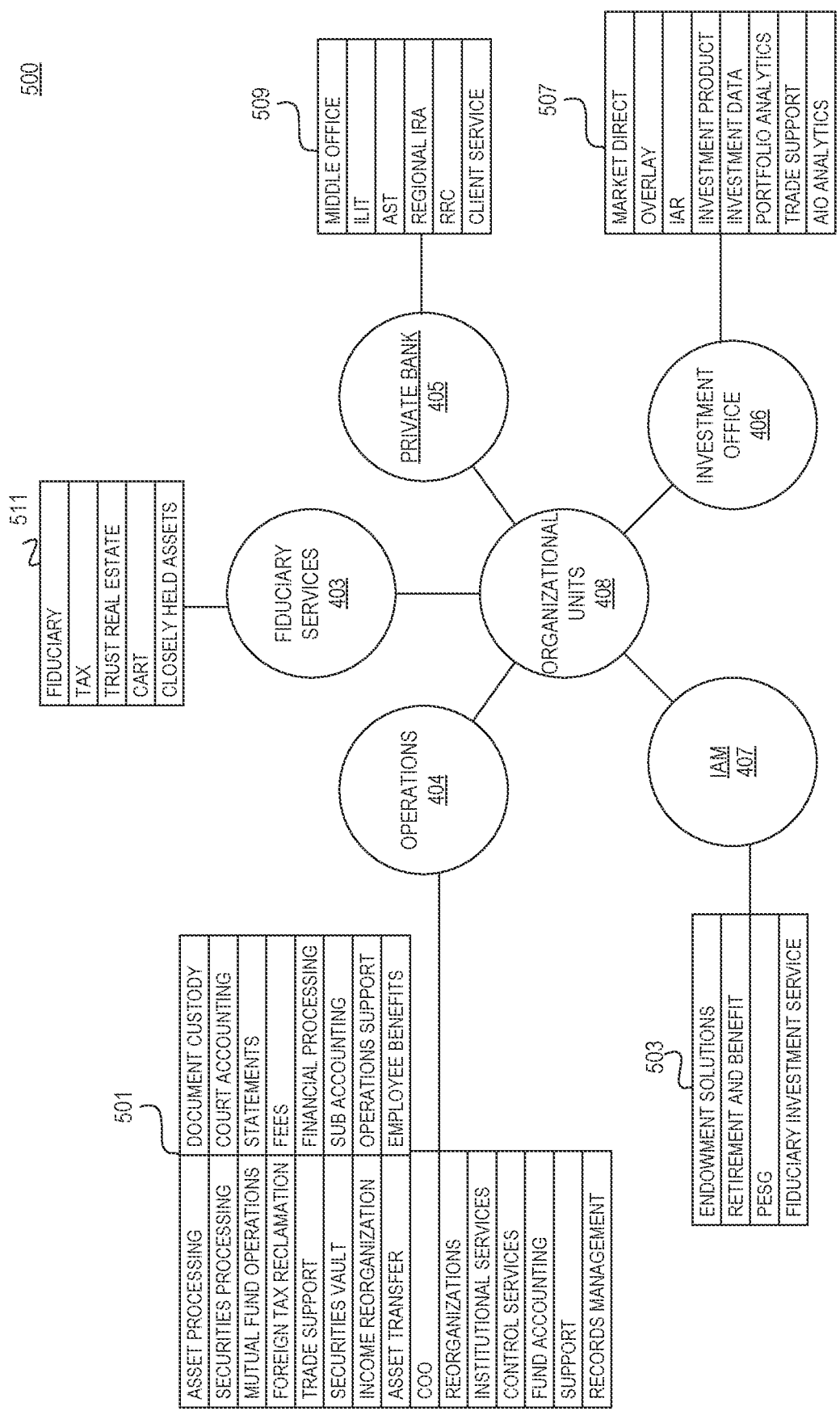
FIG. 5 depicts a diagram of an organizational decomposition framework and its contents for the organizational units shown in FIG. 4B, consistent with disclosed embodiments.

FIG. 5 depicts a diagram 500 of an organizational decomposition framework and its contents for each of the organizational units shown in FIG. 4. Disclosed embodiments may involve a method for organizational decomposition of organizational units for storage in a database.

Some embodiments may disclose providing, by the processor, an architectural framework for one or more objects of a data domain, each of the one or more objects being classified into one or more organizational units of the database. In some embodiments, the architectural framework comprises architectural data corresponding to the data domains. An architectural framework as used herein may refer to a framework for enterprise architecture that comprises an approach for designing, planning, implementing, and governing an enterprise information technology architecture. In some embodiments, the architectural framework represents an operational architecture of a financial institution. For example, this may be modeled at the following four levels; (1) Business: (2) Application; (3) Data; and (4) Technology. The one or more objects of the data domains as used herein may refer to the collection of properties, in which the properties are represented as an association between a name (or key) and a value. In some embodiments, the objects correspond to architectural elements of the architectural framework that contain properties of the one or more organizational units. Architectural elements as used herein may refer to properties associated with the one or more objects such as the diverse types of financial services offered to the user. Moreover, the one or more objects are further classified into the one or more organizational units described above with respect to FIG. 4. The classification of the one or more objects refers to the process of categorizing the data domains into their own individual distinct groups such as the organizational units, described above in FIG. 4. These classifications for the respective organizational units are based on the type of financial services offered to the user. In some embodiments, the one or more organizational units include differing services available for a user profile. In some embodiments, the organizational units include a structural role. As shown in FIG. 5, Operations 404 lists the various financial services offered as shown in table 501. These services include asset & securities processing, mutual fund operations, foreign tax reclamation, trade support, asset transfer, and more. In table 503, IAM 407 also provides different financial services under the organization, such as endowment solutions, retirement, and benefit plans, PESG (Pension & Enterprise Solutions Group), and a fiduciary investment service.

Table 511 shows different fiduciary services provided by fiduciary services 403 such as fiduciary, tax, trust real estate, CART (Corporate Access Rates and Tariff System), and closely held assets.

Table 509 shows the different fiduciary services accessible to a user's private bank, as shown with private bank 405. This includes a middle office, an AST, an ILIT, a regional IRA, RRC and client service. A middle office as used herein may refer to a department in a financial institution that provides risk management services support to a front office. An AST as used herein may refer to automated screen trading, which enables the trading of a security or contract on a computer program that allows for trade 24 hours per day. An ILIT as used herein may refer to an investment trust created during an insured's lifetime that owns and controls a term or permanent life insurance policy or policies. A regional IRA as used herein may refer to an individual retirement account. Table 507 shows the different fiduciary services accessible to a user's investment office 406, such as market direct, overlay, IAR, investment product, investment data, portfolio analytics, trade support and AIO analytics.

Some embodiments may disclose classifying, by the processor, the one or more organizational units based on architectural analytics related to the architectural framework, the organizational units including one or more characteristics related to the data domains. In some embodiments, the characteristics include features corresponding to services available to a user profile. The characteristics as described above are further utilized for classifying the one or more financial services that may be offered to a user. The financial services are classified according to the user's individual financial needs for their account and based on architectural analytics. Architectural analytics includes the process of collecting and analyzing data related to the architectural framework of the graph database. This data represents past information associated with the user's typical financial decisions for their account and presents the graph database with this information, so that the graph database can properly arrange the differing financial services in each organizational unit.

Some embodiments may disclose arranging, by the processor, the objects according to administrative and security requirements for the organizational units for decomposition and storage of the organizational units into the database. Administrative requirements as used herein may refer to a defined set of rules that the graph database must adhere to, for ensuring that the organization operates efficiently. These requirements involve efficient management and administration of the organization. These requirements may include legal requirements, business rules, data management, audit tracking, authorization levels, budgeting processes and compliance with labor laws. Security requirements as used herein may refer to, a defined set of features or additions to existing features within an organization's security environment, to protect against potential security issues. These security requirements are further derived from past industry standards, applicable laws, along with a history of detected vulnerabilities that occurred within the organization's system. These requirements exist to prevent the reoccurrence of past security failures within a system. Both administrative and security requirements may be arranged for decomposition, which involves breaking a complex system into smaller parts that are easily understood and manageable. Furthermore, these smaller parts of the organization's system can then be examined and solved, as they are broken down into the organizational units that are described above.

Figure 6:
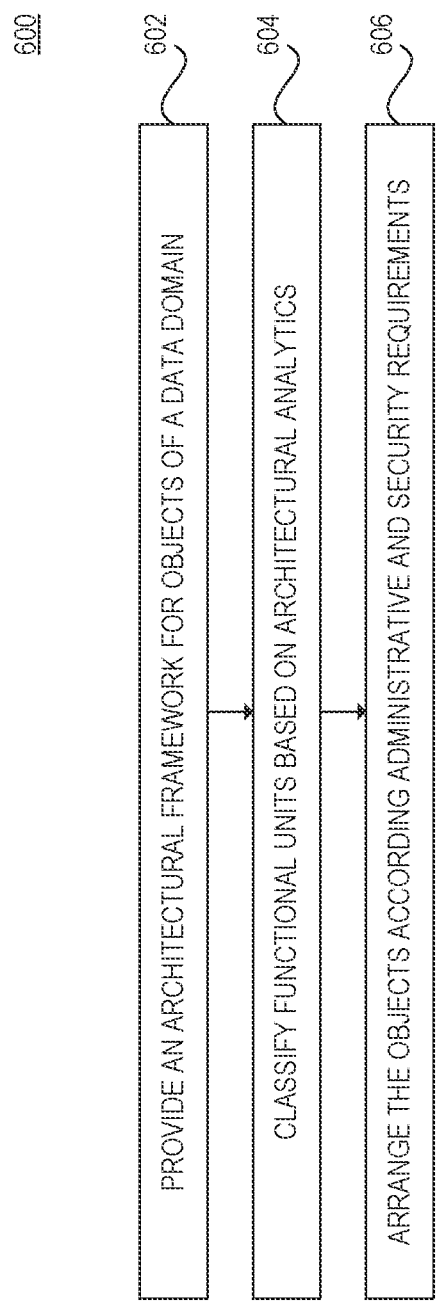
FIG. 6 depicts a flow chart for a method of organizational decomposition of organizational units, consistent with disclosed embodiments.

FIG. 6 depicts a flow chart for a method 600 of organizational decomposition of organizational units. Method 600 may include a step 602 of providing, as explained above with respect to FIG. 5, an architectural framework for objects of a data domain. Method 600 may also include a step 604 of classifying, as explained above with respect to FIG. 5, the organizational units based on architectural analytics, as for example. Method 600 further includes a step 606 of arranging, as explained above with respect to FIG. 5, the objects according to administrative and security requirements.

Justification.

Disclosed embodiments may involve maintaining a relational data model for storage in a database. A relational data model as used herein, may refer to the representation of how data is stored in relational databases. The relational databases can include of a collection of tables or entities, each of which can be assigned a unique name. The relational data model can be represented as the database including a collection of one or more databases. Relationships may represent how two distinct individual pieces of data within the database are fully connected. Within the graph database, these relationships include data points that contain properties that can be stored in conjunction with the data. Properties as used herein may refer to the attributes or characteristics of an object in a system.

These properties can include at least one or more of; at least one or more tables, columns, indexes, or other elements associated with the database. In some embodiments, a relational dataset requires one or more disparate data tables to express the graph databases' capabilities in a modeled instance. A disparate data table as used herein may refer to data tables that contain data that are unalike and are distinctly different from each other. The disparate data tables are designed to operate as a distinct data processing element that does not exchange data or interacts with other computer data processing systems. This may be used in systems, which include a software layer or an application architecture, a data layer or data architecture, and a technical architecture, in which these three layers are then contributing to form a disparate data table, which will be able to express different capabilities associated with the graph database. A modeled instance as used herein, may refer to an instance of a class that represents an object from a model. The modeled instance is comprised of one or more instances and links that are based on the class of the respective model. An instance will then correspond to an instance of either a class, data type, interface, or signal that shows the attribute or properties of the objects. Moreover, there are various graph data analysis algorithms that can perform different analyses on a graph data set. In some embodiments, the data analysis algorithm includes: a tangible similarity algorithm and a tangible centrality algorithm.

A tangible centrality algorithm involves determining the number of unique nodes within a dataset, in which unique nodes correspond to nodes, within a graph database, which are not identical to each other nor share the same identifier. In this situation, each unique node is associated with one or more entities, which are further distinguished by their individual node IDs or labels. In some embodiments, the tangible centrality algorithm includes determining unique ones of the nodes within the graph database. A tangible similarity algorithm as used herein may refer to an algorithm that computes the similarity of pairs of nodes based on their neighborhoods or their properties.

For example, utilizing the architecture graph database, the financial institution can determine the criticality of each application within its portfolio, and the degree of criticality as they relate to each other, from a business capability, data, application, and organizational entity perspective. Understanding centrality within the architecture graph database can be achieved within seconds with one query, while the notion of using a traditional relational database may not be practical. This can be due to requiring complex SQL statements that can be a burden on computing systems. Additionally, using a tangible centrality algorithm, the financial institution can understand impact analysis, i.e., how making a specific change within a portfolio would impact one or more nodes. This can assist with improving the processes in a financial institution, as this typically involves incorporating numerous resources to conduct data inspections along with applying not readily available intuition (e.g., competent data scientists) and an understanding of specific institutional processes and data storage arrangements. Yet with the graph database, it alleviates these needs by organizing and enhancing the data to present the data in a human-readable form that surfaces the impact of changes that are being made to the nodes. Furthermore, it assists with reducing processing burden and eliminates the need for developing and maintaining complex queries in a system that is constantly evolving.

In some embodiments, the tangible similarity algorithm includes computing similar pairs of the nodes based on their properties or properties of neighboring ones of the nodes. In some embodiments, the tangible similarity algorithm includes computing similar pairs of nodes based on their properties or properties of neighboring ones of nodes. For example, given the edges (i.e., relationships) being captured between the application and the one or more nodes, coupled with metadata properties specific to each node, a tangible similarity algorithm can be utilized to quickly identify application rationalization opportunities within the graph database of the financial institution. A tangible similarity algorithm can identify two applications that are performing the same organizational needs, for the same services that the financial institution can offer to their users and are therefore duplicative in nature. This would present an automated perspective for cost reduction across the financial institution's entire portfolio.

In some embodiments, a machine learning model is used to generate a data analysis algorithm trained to predict relationships in a data domain according to an architectural framework. A machine learning model as used herein may refer to a model that can find patterns or make decisions from a dataset. For example, the architecture graph database can include a machine learning model created and trained to predict where relationships should exist. This assists with providing the financial institution with a more optimal business architecture landscape. Leveraging a link to a prediction model could be used where, when analyzing target architectures, connections between application and organizational entity relationships may be missing, thus creating disjointed business processes. This informs architecture recommendations and prioritization efforts to ensure minimal business disruption. In some embodiments, the data analysis algorithm logically segregates the data domains according to architectural framework.

The data analysis algorithms referred to above (e.g., tangible similarity and tangible centrality) can logically segregate the data domains by categorizing them according to the standard architectural framework used. Logically segregating, as used herein, may refer to dividing the data domains in a logical and organized form based on specific criteria. This further involves organizing data of each of the four data domains and organizing the data of those four domains into their respective data domains such as business, technology, application, and data.

In some embodiments, a graph database is accessed and that includes nodes and edges as a data model for representing data objects of the data domain according to the architectural framework, the nodes being configured to store first-class entities and the edges being configured to store relationships between the first-class entities. Edges as used herein may refer to the relationships established between nodes. The edges represent how the individual nodes are related to each other and contain properties. First-class entities, as used herein, may refer to a subset of a node. The first-class entities include of one or more fields stored within the graph database. These properties are responsible for describing the type of relationship present among the nodes. Nodes can include of any number of key-value pairs which also can be viewed as properties. Key value pairs, as used herein, may refer to a key, which is constant and defines the data set, and a value, which is a variable that belongs to the set, For example, within the graph database, this may include the name of each node. In some embodiments, the nodes include a set of data in the graph database for the data representation model of the graph database. The set of data within the graph database is associated with the data domains of the graph database, in which it is then modeled into respective data categories for each data domain in a data model. This can be furthered modeled via the first-class entities of the nodes. The first-class entities are formalized according to their properties and then match the expected syntax for one or more relationship types to create a model for the node and relationship view for the model. In some embodiments, the graph database classifies relationships for the data objects as the first-class entities. In some embodiments, the graph database includes the relationships between data points that contain properties for the first-class entities.

Moreover, labels are then added to the nodes and the graph database determines the properties of the nodes and relationships for the data model of the graph database. In some embodiments, individual data objects of the data domain are stored within the database according to relationships between the first-class entities in the data domain, the relationships containing architectural properties of the architectural framework, for an instance of querying, the querying including searching for applications within the data domain. Querying as used herein may refer to the process of requesting information from a database using a specific set of criteria or query. Querying allows for the retrieval of data that match the specific set of criteria.

In the context of a graph database, querying may include using a query language such as SQL (Structured Query Language), and CQL (Cypher Query Language) that are general languages for interacting with the graph database. This further includes statements for defining and changing the database schema, populating the contents of the database, searching the contents of the database, updating the contents of the database, defining integrity constraints over the database, defining stored procedures, defining authorization rules, defining triggers, etc. For example, querying the data can involve using a language developed for the graph database in question. CQL as used herein may refer to a graph query language that enables for expressive and efficient data querying in a property graph. CQL is based on necessary components and needs of the architectural graph database that is based on graph theory, which enables data to be structured as nodes and relationships, to clearly focus on how entities within the data are connected and related to each other.

A query using CQL to search for any applications that pass a particular set of data between them may look like the following: MATCH result=(source: Application)-[: PASSES_DATA {dataDomain: 'Banking'}]→(destination: Application) return result. CQL uses an ASCII-art type of syntax where (nodes)-[: ARE_CONNECTED_TO]→(otherNodes) using rounded brackets for circular (nodes), and-[: ARROWS]→for relationships, that upon writing the query, a graph pattern is then drawn for the data.

In some embodiments, data objects are queried using a querying language for the database. In some embodiments, the graph database includes querying data containing the relationships. As described above, the modeling language used for the architectural graph data base is the CQL that is based on the concept of graph theory, which in a data model of the graph database has the data structured as nodes (that also can be represented as "vertices") and relationships (that also can be represented as "edges"), to focus on how entities within the data are connected and related to each other.

In some embodiments, the data analysis algorithm is applied to identify represent patterns in the graph database. The above-mentioned data analysis algorithms such as tangible centrality and tangible similarity have been described above, as to how these respective data analysis algorithms are applied to the architectural graph database. Yet respective graph databases may also include identifying patterns in the architectural graph database. The nodes and relationships allow for the formation of graph patterns using CQL, as these graph patterns can be further expanded to express simple to complex patterns. Patterns as used herein may refer to how the data is described using a syntax that describes the nodes and relationships of a property graph. The patterns can be formed as a continuous path or separated further into smaller patterns. For CQL, to successfully represent the patterns, the nodes and relationships' respective syntaxes must be combined.

Figure 7:
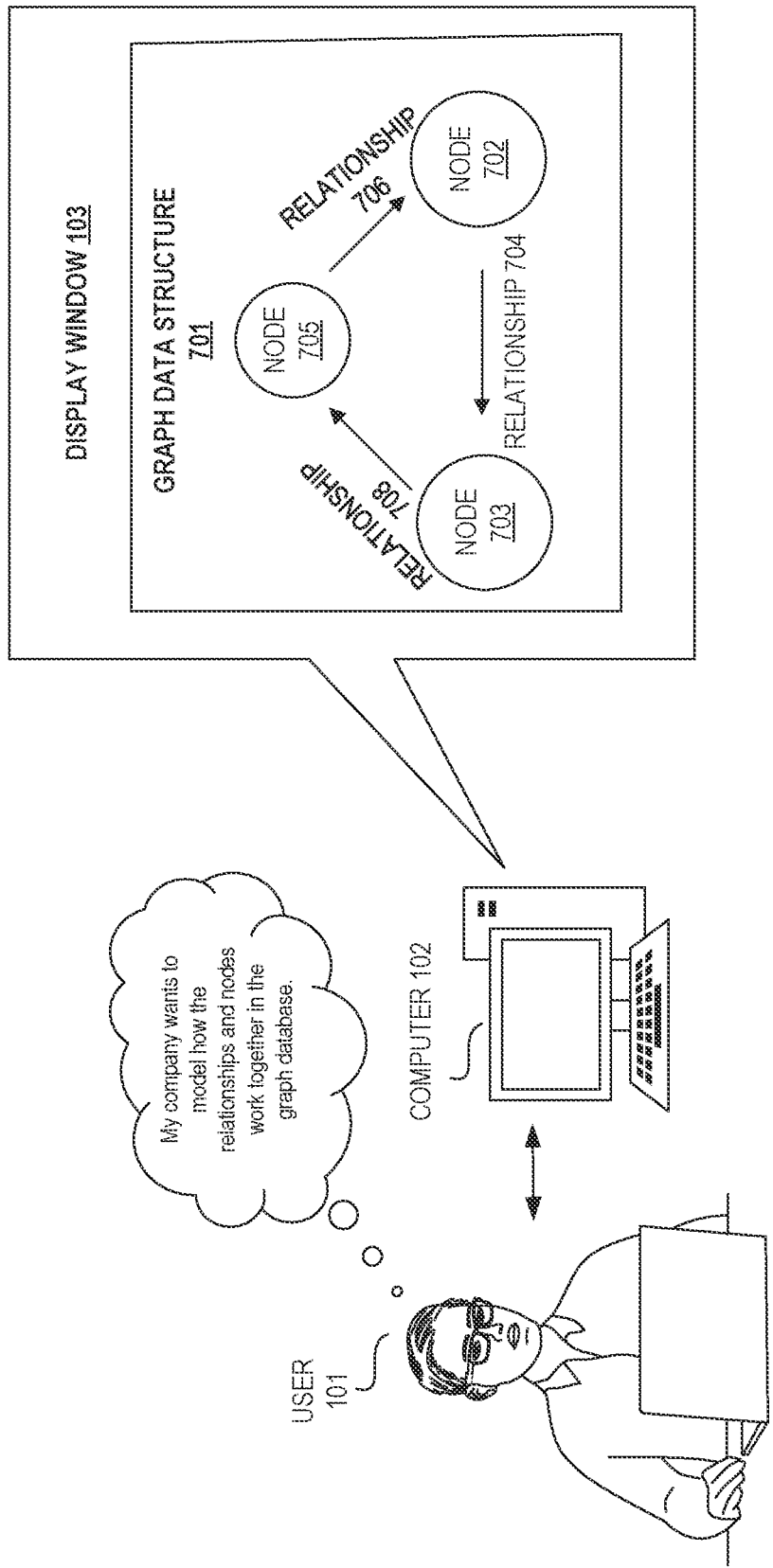
FIG. 7 depicts an exemplary illustration of a user using a computing device displaying a graph data structure representing relationships and nodes, consistent with disclosed embodiments.

FIG. 7 depicts an exemplary illustration of a user using a computing device displaying a graph data structure representing relationships and nodes. Nodes as used herein, may refer to a basic unit of a data structure, which can be either a linked list or a tree data structure. Nodes contain data that allows for the linkage of information to other nodes, in which these links are implemented by pointers. Pointers may refer to an object that stores a memory address. A node represents the information contained in a single data structure. These nodes may contain a value or condition or serve as another independent data structure. Nodes can be represented by a single parent node. In the example depicted in FIG. 1, user 101 uses computer 102 to view the graph databases' nodes and relationships. Relationships as used herein may refer to the connection between a source node and target node, and how they can be related. In FIG. 7, computer 102 displays a graph data structure 701. For example, relationship 706, relationship 708, and relationship 704 demonstrate the connections between nodes 705, 702, 703, and 705. Node 705 and Node 702 are connected by relationship 706, and nodes 702 and 703 are connected by relationship 704. User 101 considers: "My company wants to model how the relationships and nodes work together in the graph database." User 101 then opens display window 103, in which user 101 is presented with graph data structure 701 depicting this mutual arrangement between the individual nodes and relationships. Nodes 705, 702, and 703 representing the entities (e.g.,) discrete objects of the data domain.

Figure 8:
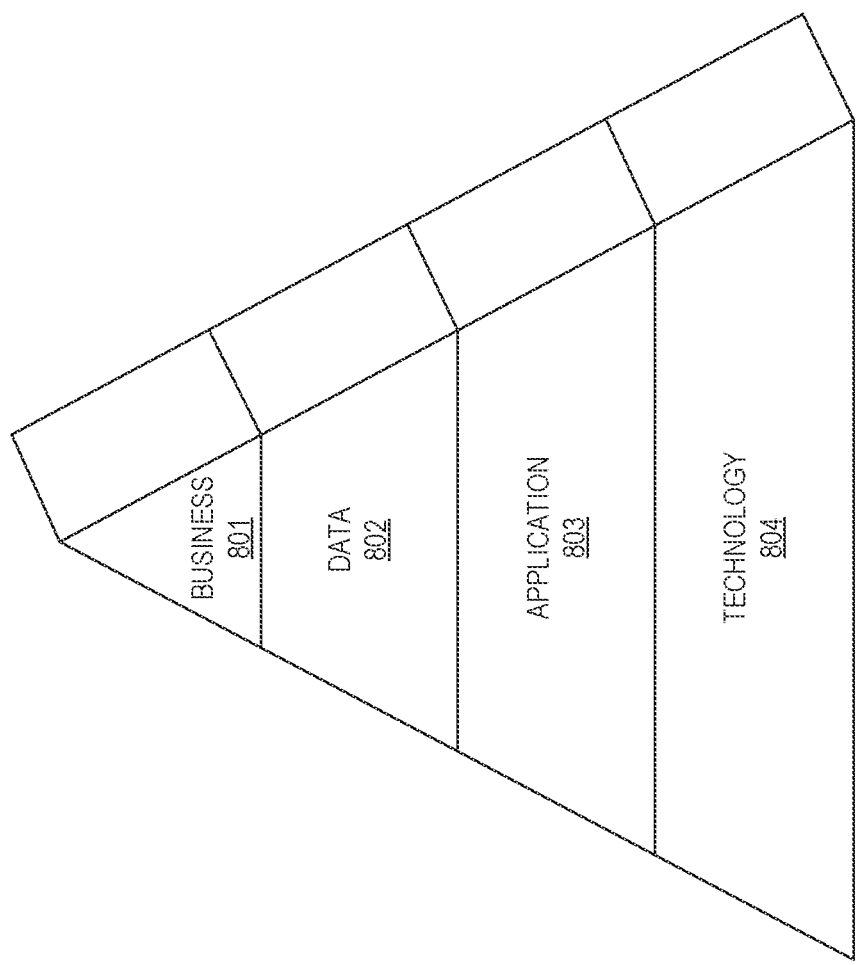
FIG. 8 depicts a pyramid chart for different domains corresponding to an enterprise architecture, consistent with disclosed embodiments.

FIG. 8 depicts a pyramid chart for different domains corresponding to an enterprise architecture. In the example depicted in FIG. 8, a business 801 is shown at the top-most portion of the pyramid chart 800. Business 801 represents a business domain. A business domain as used herein, may refer to the structure and behavior of a business system. This may include covering business goals, business functions and business capabilities. Data 802 is shown at the second-highest portion of the pyramid chart 800. Data 802 represents a data domain. A data domain as used herein, may refer to the descriptions of data in storage and data in motion. Application 803 is shown at the third-highest portion of the pyramid chart 800. Application 803 represents an application domain. An application domain as used herein, may refer to the structure and behavior of applications used in a business, which may be focused on how they interact with each other and with users. Lastly, Technology 804 is shown at the lowest portion of pyramid chart 800. Technology 804 represents a technology domain. A technology domain as used herein, may refer to the structure and behavior of the IT infrastructure. This may include covering the client and server nodes of the hardware configuration, and the infrastructure run on them, in which the infrastructure provides services that they offer to applications, protocols, and networks that connect application and nodes.

Figure 9:
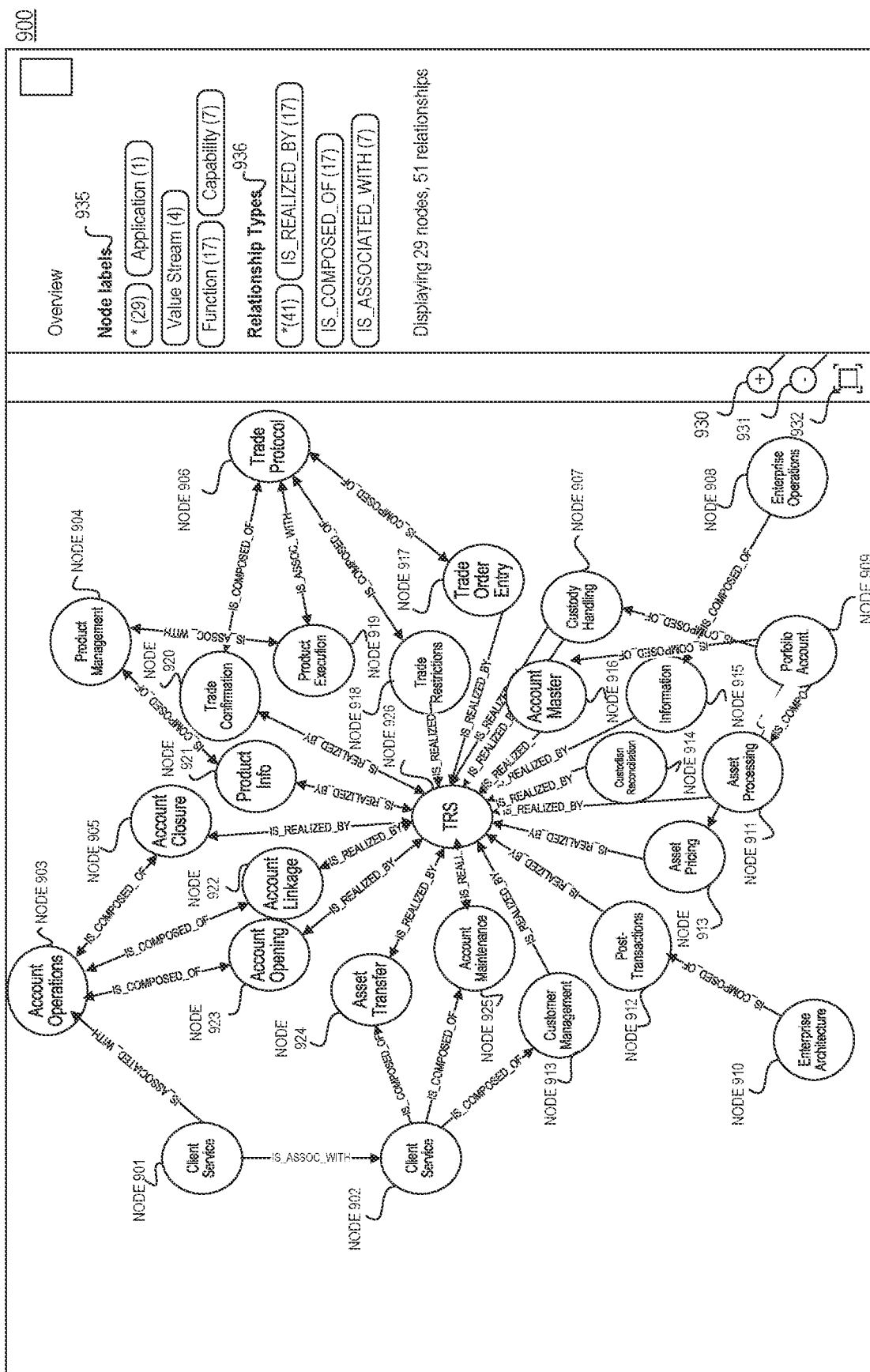
FIG. 9 depicts an exemplary graphical user interface (GUI) for displaying relationships between nodes including node labels and relationship types, consistent with disclosed embodiments.

FIG. 9 depicts an exemplary graphical user interface (GUI) 900 for displaying relationships between nodes including node labels and relationship types. GUI 900 represents a graph-database view of the nodes and edges. Nodes 901-926 represent the one or more nodes in GUI 900, that all have their respective node labels 935 such as; (1) Application; (2) Value Stream; (3) Function; and (4) Capability. Node labels 935 are considered as a named graph construct that groups node 901-925 into their respective sets. All nodes 901-925 can be labeled with the same label as they belong to the same set. Node labels 935 can be viewed as tags that allow for the graph database to specify certain types of first-class entities to search for or to create. GUI 900 may include a maximization window 930, minimization window 931, and a full screen window 932, which can allow for a user to swap between multiple views. As mentioned above, "application," "value stream," "function" and "capability" are exemplary labels under node labels 935. CQL checks those labels for queried information related to a financial account, which enables CQL to properly distinguish between the first-class entities and optimize execution for queries as the usage of node labels, are always the most optimal to use.

Node 901 and Node 919 are assigned to node label "Value Stream" under node label 935. Value stream as used herein may refer to the set of actions that add value to a user from an initial request through realization of value by the customer. The value streams starts with an initial concept, that progressively moves through various stages of development. Node 901 is designated as "Client Service", which represents the processes and interactions organizations and members of the financial institution have with their clients. Node 919 is designated as "Product Execution", which represents a new financial product or a financial product that has additional features. This includes product development, internal and external testing, and the application of execution results.

Node 902, Node 903, Node 904, Node 906, Node 908, Node 909, Node 910, are assigned to the node label "Capability". Capability as used herein may refer to a mapping, which represents a visual representation of an organization's capability of building stages. It describes capabilities that are needed to operate and execute. Node 902 is designated as "Client Service", and as mentioned above, represents the processes and interactions organizations and members of the financial institution have with their clients. Node 903 is designated as "Account Operations", which represents services associated with budgeting and resource allocation to support business functions and maintain the highest client satisfaction. Node 904 is designated as "Product Management", which represents a role within a product development team that focuses on successfully executing the product lifecycle. Node 906 is designated as "Trade Protocol", which represents official procedures or system of rules governing trade for an account at the financial institution. Node 908 is designated as "Enterprise Operations", which represents business processes and supporting organizational entities that can be placed into operation to perform operations of the enterprise. Node 909 is designated as "Portfolio Account", which represents the account that is created to hold funds for a customer that is available to invest. Node 910 is designated as "Enterprise Architecture", which represents a business function concerned with the structures and behaviors of a business, especially business roles and processes that create and use business data.

Node 905, Node 907, Node 911, Node 912, Node 913, Node 914, Node 915, Node 916, Node 917, Node 919, Node 920, Node 921, Node 922, Node 923, and Node 925 are assigned to the label "Function". Function as used herein, may refer to the practices and activities directed to the management of financial services offered by the financial institution. Node 905 is designated as "Account Closure" represents an account that has been de-activated or terminated by the account holder. Node 907 is designated as "Custody Handling" and represents holding, directly or directly, funds of an account. Node 911 is designated as "Asset Processing" represents the management of one or more types of assets within an organization. Node 912 is designated as "post-Transactions" and represents a completed transaction that has been fully processed. Node 913 is designated as "Customer Management" and represents the process of a business or an organization that properly administers its interactions with its customers, using data analysis to train a model using this information.

Node 914 is designated as "Custodian Reconciliation" and represents matching amounts of funds that are paid, received, and held electronically by customers to any internal statement. Node 915 is designated as "Information" and represents transactional information associated with the customer's account. Node 916 is designated as "Account Master" and represents the record of financial rights and obligation of an account holder and the financial institution. Node 917 is designated as "Trade Order Entry", and as mentioned above, represents an action of initiating a trade to buy and sell to close a trade. Node 919 is designated as "Product Execution" and represents the process of bringing an organization's product from the initial concept stage to the final stage of development within a product lifecycle. Node 920 is designated as "Trade Confirmation" and represents the confirmation of key trade details, such as the date and time of a transaction, the price at which the security was bought or sold, and the quantity of shares bought or sold.

Node 921 is designated as "Product Info" and represents the data associated with a specific product within the organization. Node 922 is designated as "Account Linkage" and represents an account that is connected to another financial institution. Node 923 is designated as "Account Opening" and represents a recently opened account. Node 925 is designated as "Account Maintenance" and represents the holding or maintaining of an account on behalf of any person, or providing a person, directly or indirectly, with the means to manage, track, or create reports on an account, whether accomplished through the use of software or otherwise.

Node 926 is assigned to the label "Application". Application as used herein, may refer to the application program or application software and is a computer software package that performs a specific function directly for an end user. Node 926 is designated as "TRS", Total Return Swap, represents a type of swap agreement that allows one party to transfer the total return of a specific asset to another party. The total return is the combination of capital gains and income earned from holding an asset.

Nodes 901-926 all require relationships. As mentioned, previously, a relationship enables the connection of one or more nodes and allows for a user to properly find related nodes of data. Relationship types 936 include; (1) "IS_REALIZED_BY"; (2) "IS_COMPOSED_OF"; and (3) "IS_ASSOCIATED WITH_". These are defined as several types of relationships that exists between nodes 901-926. The relationships of relationship types of 936 consist of a source node and a target node, which shows the direction of the arrow therebetween in FIG. 9. The graph database enables equal traversal performance in either direction, which allows for efficient querying of the relationship without precisely specifying the direction. Furthermore, the graph database includes of no broken links, i.e., ensuring that the existing relationships of relationship types 936 will never point to a non-existing end point. Node 901 and Node 902 designate an "IS_ASSOCIATED WITH_" relationship, in which Node 902 is connected to Node 924, Node 925 and Node 913 to designate an "IS_COMPOSED_OF_" relationship. Node 901 and Node 903 designate an "IS_ASSOCIATED_WITH" relationship, in which Node 903 is further connected to Node 923, Node 922 and Node 905 to designate an "IS_COMPOSED OF_" relationship. Node 921 and Node 904 designate an "IS_COMPOSED_OF" relationship, in which Node 904 is designated with an "IS_ASSOCIATED_WITH" relationship with Node 919. Node 920, Node 919, Node 918, Node 917, designate a relationship "IS_COMPOSED_OF" with Node 906. Node 909 designates a relationship "IS_COMPOSED_OF" with Node 915 and Node 907, while Node 908 designates a relationship "IS_COMPOSED_OF" with Node 915. Node 909 designates a relationship, "IS_COMPOSED_OF" with Node 911. Node 910 designates a relationship, "IS_COMPOSED_OF" with Node 912. Nodes 907, Node 913, Node 916, Node 920, and the remaining nodes, all have a sole relationship with Node 926, designated as "IS_REALIZED_BY".

Figure 10:
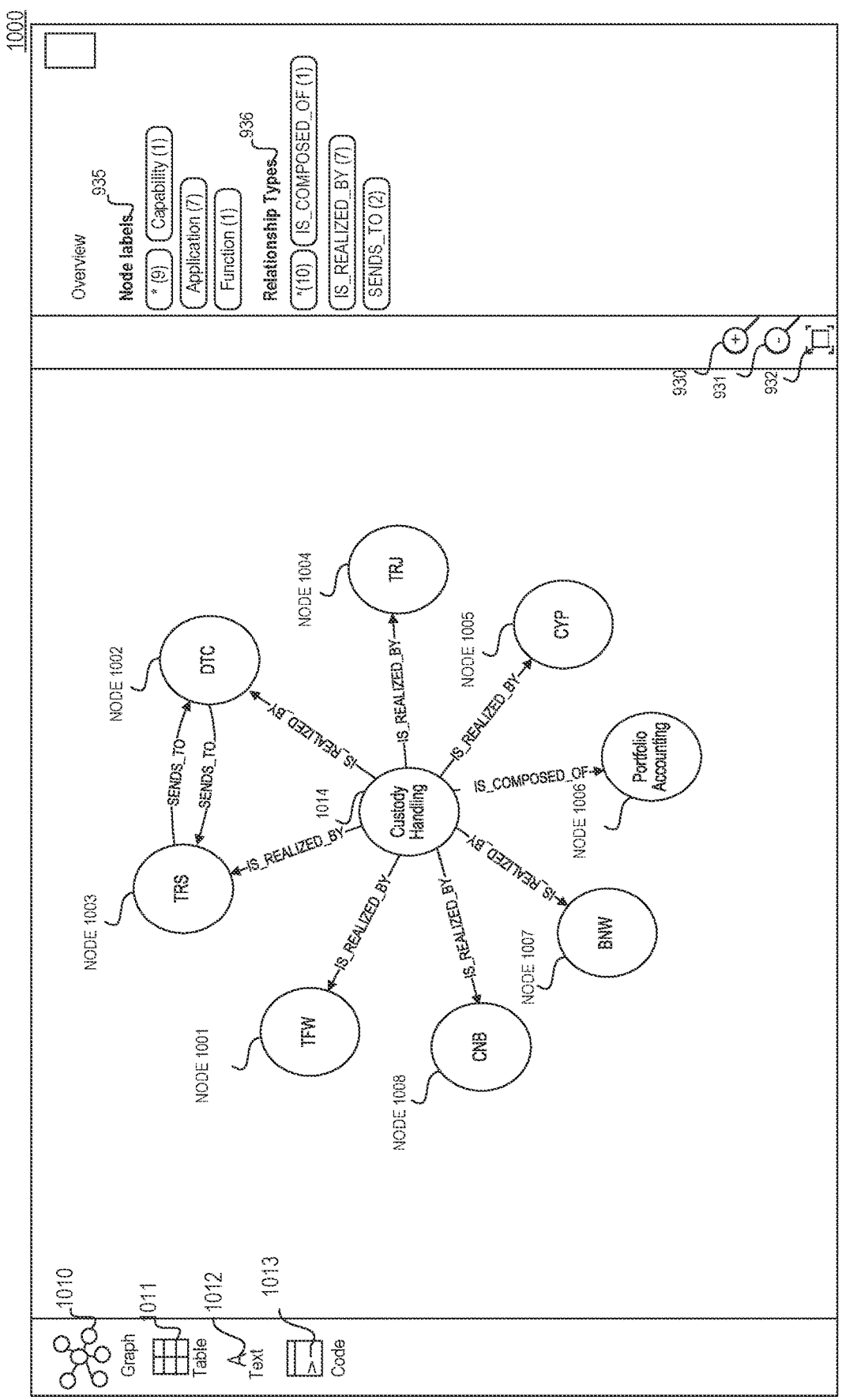
FIG. 10. depicts another exemplary graphical user interface (GUI) for displaying relationships between nodes including node labels and relationship types, consistent with disclosed embodiments.

FIG. 10. depicts a secondary exemplary graphical user interface (GUI) 1000 for displaying a relationship between nodes including node labels and relationship types. Similar to the description above for FIG. 9, GUI 1000 represents a graph-database view of the nodes and edges. Nodes 1001-1008 represent the one or more nodes in GUI 1000, that all have their respective node labels 935 such as; (1) Application; (2) Value Stream; (3) Function; and (4) Capability. Node labels 935 are considered as a named graph construct that groups node 1000-1008 into their respective sets. All nodes 1001-1008 can be labeled with the same label as they belong to the same set. GUI 1000 may include maximization window control 930, minimization window control 931, and a full screen window control 932, which can allow for a user to swap between multiple views. GUI 1000 can also include graph 1010, table 1011, text 1012, and code editor 1013. Graph 1010 permits another view of the database in standard graph form, table 1011 represents the nodes and relationship in a tabular view, text 1012 allows the text to be magnified or minimized according to their font size, and code editor 1013 allows for the viewing of the source code for the CQL. Relationship types 936 include; (1) "IS_REALIZED_BY"; (2) "IS_COMPOSED_OF"; and (3) "SENDS_TO". These are defined as several types of relationships that exist between nodes 1001-1008.

Node 1001, Node 1002, Node 1003, Node 1004, Node 1005, Node 1007, and Node 1008 designate a relationship to Node 1014, designated as "IS_REALIZED_BY". Node 1006 designate a relationship with Node 1014 but has the data label, "Capability". Node 1003 and Node 1002 designate a relationship, "SENDS_TO".

Figure 11:
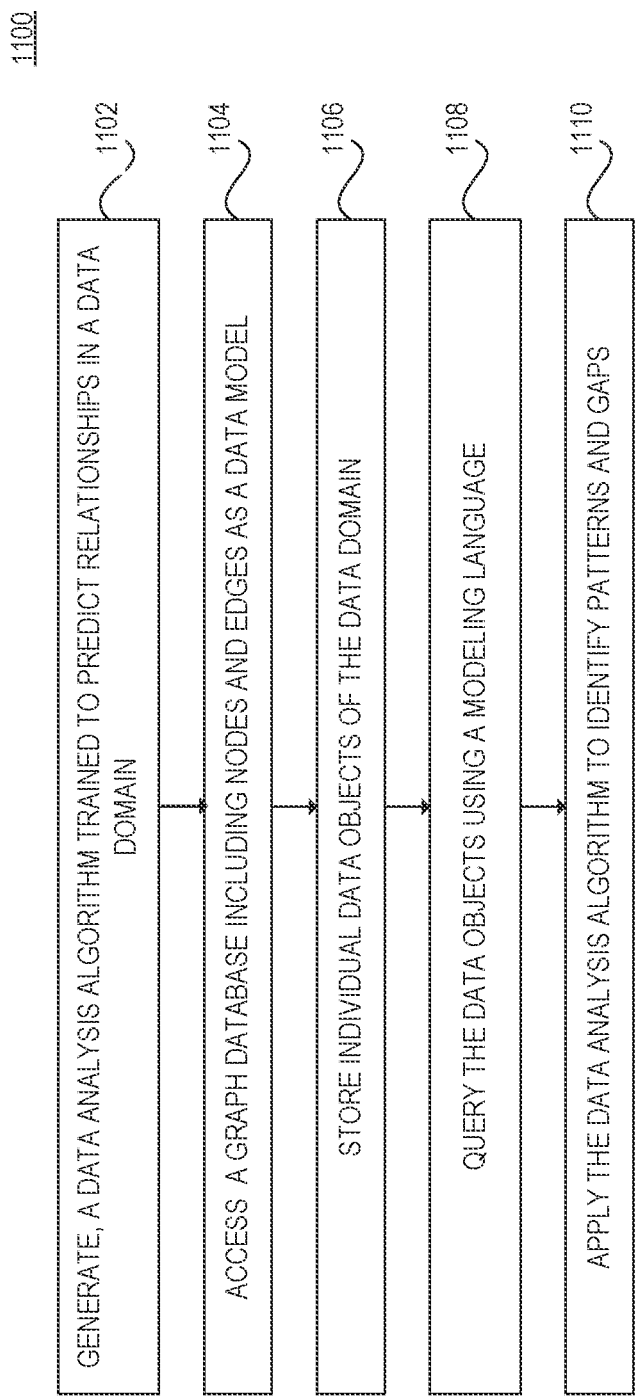
FIG. 11 depicts a flow chart for a method of maintaining a relational data model from an architectural framework, consistent with disclosed embodiments.

FIG. 11 depicts a flow chart for a method 1100 of maintaining a relational data model from an architectural framework. Method 1100 may include a step 1102 of generating, as explained above with respect to FIG. 7, a data analysis algorithm trained to predict relationships in a data domain. Method 1100 may also include a step 1104 of accessing, as explained above with respect to FIG. 7, a graph database including nodes and edges as a data model. Method 1100 may also include a step 1106 of storing, as explained above with respect to FIG. 5, individual data objects of the data domain. Method 1100 may also include a step 1108 of querying, as explained above with respect to FIG. 7, the data objects using a modeling language. Method 1100 may further include a step 1110 of applying, as explained above with respect to FIG. 7, the data analysis algorithm to identify patterns.

Nodal and Data Label Analysis

Disclosed embodiments may include a computer-implemented method for analyzing nodes and data labels for storage in a database. In some embodiments, each of the nodes includes a data label, the data label corresponding to a graph construct used to group the nodes into sets. In some embodiments, each of the nodes includes at least one classification to enable nodal analysis. Nodal analysis, as used herein, may refer to the analysis of one or more nodes within an architectural graph database. The classification can occur by associating the nodes with their respective relationships. In some embodiments, the nodes represent discrete objects that are connected by relationships. The discrete objects are those which are separated from (not connected to/distinct from) each other. In some embodiments, the nodes include relationships containing a source node and target node.

Disclosed embodiments may involve generating, a plurality of nodes according to an architectural meta-model for a database. In some embodiments, the architectural meta-model includes phases and data labels for the data object. Phases as used herein may refer to the numerous steps involved in the lifecycle of a graph database. For example, this may include an MVP (Minimum Viable Product) phase, which relates to a phase with sufficient features to be usable by users for feedback for future development. The data labels include labels that are related to the nodes that can be generated during the MVP phase.

In some embodiments, the nodes include relationships including an absence of broken links, the broken links ensuring that an existing relationship cannot point to a non-existing end point. In some embodiments, the nodes include relationships for organizing the nodes into structures to resemble a compound entity. As mentioned above with respect to FIG. 9, broken links are responsible for ensuring that the existing relationships of relationship types 936 will never point to a non-existing end point.

Disclosed embodiments may involve providing meta-data associated with a data object stored by the generated plurality of nodes from the architectural meta-model for the database. Meta-data as used herein refers to pertinent information about data associated with the architectural graph database. The meta-data provides additional information about the organization, structure, and attributes of the data that will be stored within the graph database. This information may include information such as the types of data, field names associated with the data, table names, relationships, indexes, and constraints to ensure for efficient database management.

Disclosed embodiments may involve grouping the generated plurality of nodes into at least one or more sets, the sets including ones of the generated nodes that contain the same data label corresponding to the same set for the data object. In some embodiments, the at least one or more sets of nodes are configured to be further divided into subsets A set as used herein may refer to a collection of data associated with the graph database that share common properties. For example, the nodes 901-926 described above with respect to FIG. 9, represent a subset of data from one or more database tables or from the result of a query that provides a grouping of records with common properties and characteristics. These sets are used to enable efficient querying of data in the database.

Disclosed embodiments may involve storing properties of the architectural meta-model that include name-value pairs of data for use on the generated plurality of nodes or one or more relationships. In some embodiments, properties include attributes of entities corresponding to the architectural meta-model as key-value properties. Name-value pairs as used herein may refer to data that is represented by a series of one or more key-value pairs. Each pair consists of a key and an associated value. This represents two associated groups through the key and value, as this type of data ensures the storing of large quantities of data, for efficient organization and sorting of information for the architectural graph database.

Figure 12:
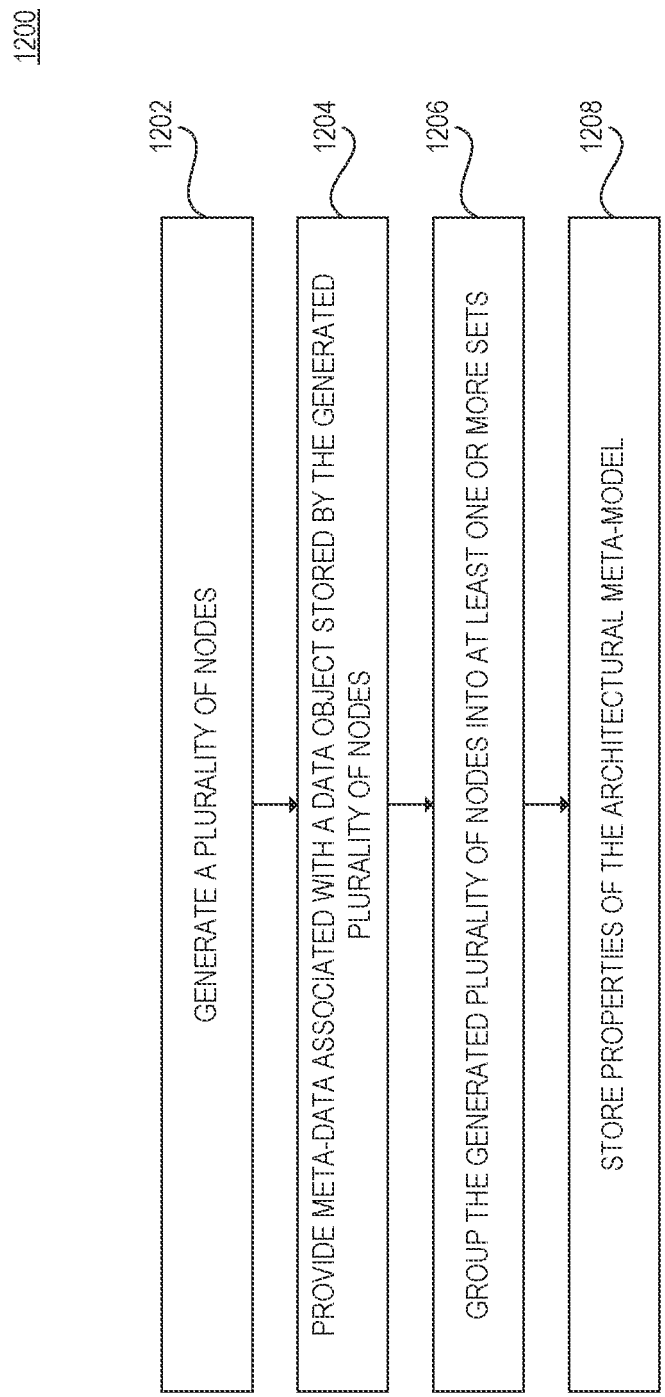
FIG. 12 depicts a flow chart for a method of nodal and data label analysis, consistent with disclosed embodiments.

FIG. 12 depicts a flow chart for a method 1200 of nodal and data label analysis. Method 1200 may include a step 1202 of generating, as explained below with respect to FIG. 13, a plurality of nodes. Method 1200 may also include a step 1204 of providing, as explained below with respect to FIG. 13, meta-data associated with a data object stored by the generated plurality of nodes. Method 1200 may also include a step 1206 of grouping, as explained below with respect to FIG. 13, the generated plurality of nodes into at least one or more sets. Method 1200 may also include a step 1208 of storing, as explained below with respect to FIG. 13, properties of the architectural model.

Figure 13:
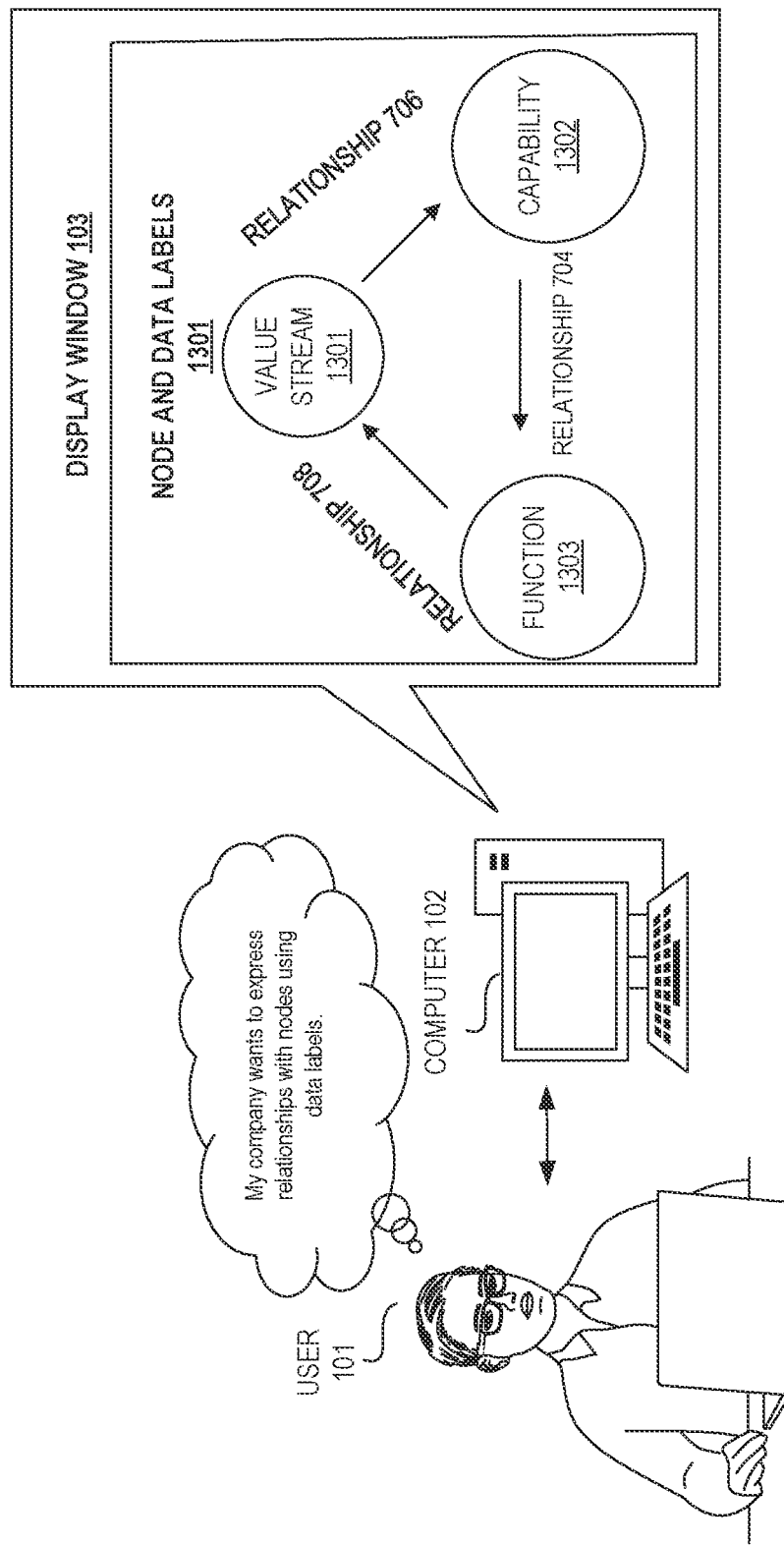
FIG. 13 depicts an exemplary illustration of a user using a computing device displaying a graph data structure representing nodes and data labels, consistent with disclosed embodiments.

FIG. 13 depicts an exemplary illustration 1300 of user 101 using computing device 102 that displays an exemplary diagram of a graph data structure representing nodes and data labels 1301. More particularly. FIG. 13 depicts an exemplary diagram of one or more nodes and data labels along with their relationships. User 101 considers: "My company wants to express relationships with nodes using data labels". User 101 then uses computer 102 to view information pertaining to the nodes and data labels that are designated according to their relationships. User 101 opens display window 103, in which user 101 is presented with nodes and data labels that have their own respective relationships. The nodes include value stream 1301, capability 1302, and function 1303, which have been defined above with respect to FIG. 9, along with their associated relationships, relationship 704, relationship 706 and relationship 708. User 101 opens display window 103 (FIG. 1), in which user 101 is presented with value stream 1301 having designated relationship 708 with function 1303, value stream 1301 having designated relationship 706 with capability 1302, and capability 1302 having designated relationship with function 1303. At value stream 1301, the statement of value is delivered at this stage and comes from an ASI source. The subsequent nodes all consist of an ASI source. An ASI source as used herein may refer to any software or application that is made available to the user, in which data associated with the nodes are transmitted from.

Working Meta-Model

Disclosed embodiments may involve categorizing architectural information across one or more data domains according to an architectural framework. Architectural information as used herein may refer to critical details regarding the structure and design of the graph database. In some embodiments, the data domains correspond to structure of how an entity collects, stores, and integrates data into a source system. This includes information about the databases' architecture such as component arrangement, along with how the differing components of the database interact with each other. Furthermore, the architectural information enables the database system to be organized.

Disclosed embodiments may involve constructing rules, constraints, and relationships corresponding to the data domains using an architectural meta-model of the architectural framework. Both rules and constraints as used herein may refer to criteria used to enforce data processing and maintaining data quality, as it assists with defining conditions that must be met for the data to processed, added, deleted, or modified within the architectural graph database. These constraints may include a "primary key" constraint that enables each node in a table to have a unique identifier, a "foreign key" constraint, which links data across tables, a "check constraint" which specifies a condition that the data values must meet in a row in a database table, a "unique constraint" which allows for values within a specific column or set of columns to be unique, and a "default" constraint, which allows for providing the default value for a column within the table of the architectural graph database, if there is no value specified. The mentioned rules and constraints assist with maintaining data accuracy and consistency within the architectural graph database. An architectural meta-model as used herein may refer to a model that documents the component types of an enterprise from an architecture viewpoint. It is a prescriptive language which explains the objects and their relationships. In some embodiments, the architectural meta-model includes one or more channels including a digital, phone, or email channel. In some embodiments, the architectural meta-model includes value propositions for representing information corresponding to user relationships, channels, and user segments. Value proposition, as used herein, may refer to the service or feature intended to make an organization's product attractive to customers. In some embodiments, the architectural meta-model combines elements of the data domains. These elements, as mentioned before, are the nodes that contain the data for each data domain. In some embodiments, the architectural meta-model includes commodities that allow a user to display relationships for architectural data components within the meta-model. The architecture metamodel is used to categorize information across each domain across a financial institution (strategy, business, data, application, technology). In some embodiments, the architectural meta-model includes constructing relationships corresponding to architecture data. The metamodel is used for the construction and development of the rules, constraints, and relationships of architecture data. This enables analysis of the architecture data components to derive insights into things like business strategy, capabilities, functions and organizational gaps, dependencies, constraints, impacts, etc.

Disclosed embodiments may involve analyzing components of the data domains to derive the architectural information for the one or more data domains. Components as used herein may refer to the one or more software or hardware elements that comprise the architectural graph database. This includes a database engine which allows for the software that manages and retrieves data, a storage manager, which is responsible for physical data storage such as file management, a query processor which enables for query optimization and execution, while also handing CQL queries for the graph database and a security manager which enables for controlled access to the architectural graph database and enforces security policies.

Disclosed embodiments may involve triggering an application associated with the architectural meta-model using a process model to identify the constructed rules, constraints, and decisions for the graph database. Triggering as used herein may refer to a stored procedure or script that enables the automatic execution of a program, in response to specific events or actions within the architectural graph database. In some embodiments, the triggering between at least two or more application, and results in decomposing units of one of the data domains for technology delivery. This relates to the organizational decomposition discussed above with reference to FIG. 4. In some embodiments, the application includes an ARIS (Architecture of Integrated Information Systems) application for displaying servers that the application processes and storing the architectural information of the graph database. ARIS as used herein, may refer to an application utilized at the financial institution to visualize and document the underlying technology necessary to deliver an application. For example, ARIS may show all of the servers that an application utilizes to process and store information. In some embodiments, the application includes decomposing one or more organizational units from the data domain for analysis, as was also further discussed with reference to FIG. 4, in relation to organizational decomposition.

Figure 14:
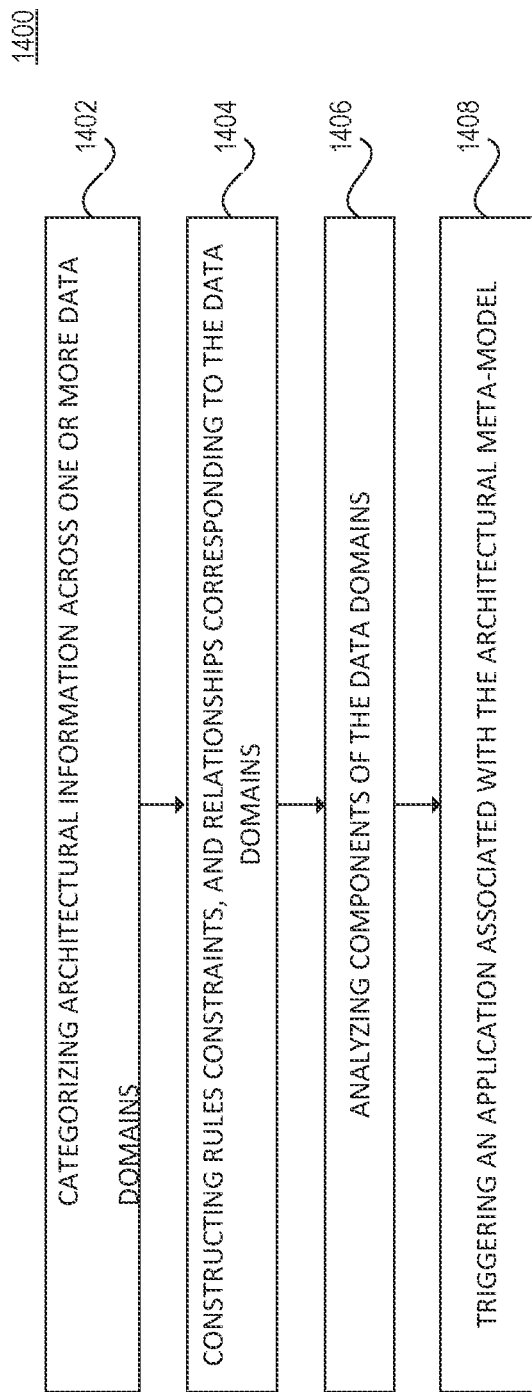
FIG. 14 depicts a flow chart for a method of applying a metamodel of a graph database, consistent with disclosed embodiments.

FIG. 14 depicts a flow chart for a method 1400 of applying a metamodel of a graph database. Method 1400 may include a step 1402 of categorizing, as explained below with respect to FIG. 15, architectural information across one or more data domains. Method 1400 may also include a step 1404 of constructing, as explained below with respect to FIG. 15, rules constraints, and relationships corresponding to the data domains. Method 1400 may also include a step 1406 of analyzing, as explained below with respect to FIG. 15, components of the data domains. Method 1400 may also include a step 1408 of triggering, as explained below with respect to FIG. 15, an application associated with the architectural meta-model.

Figure 15:
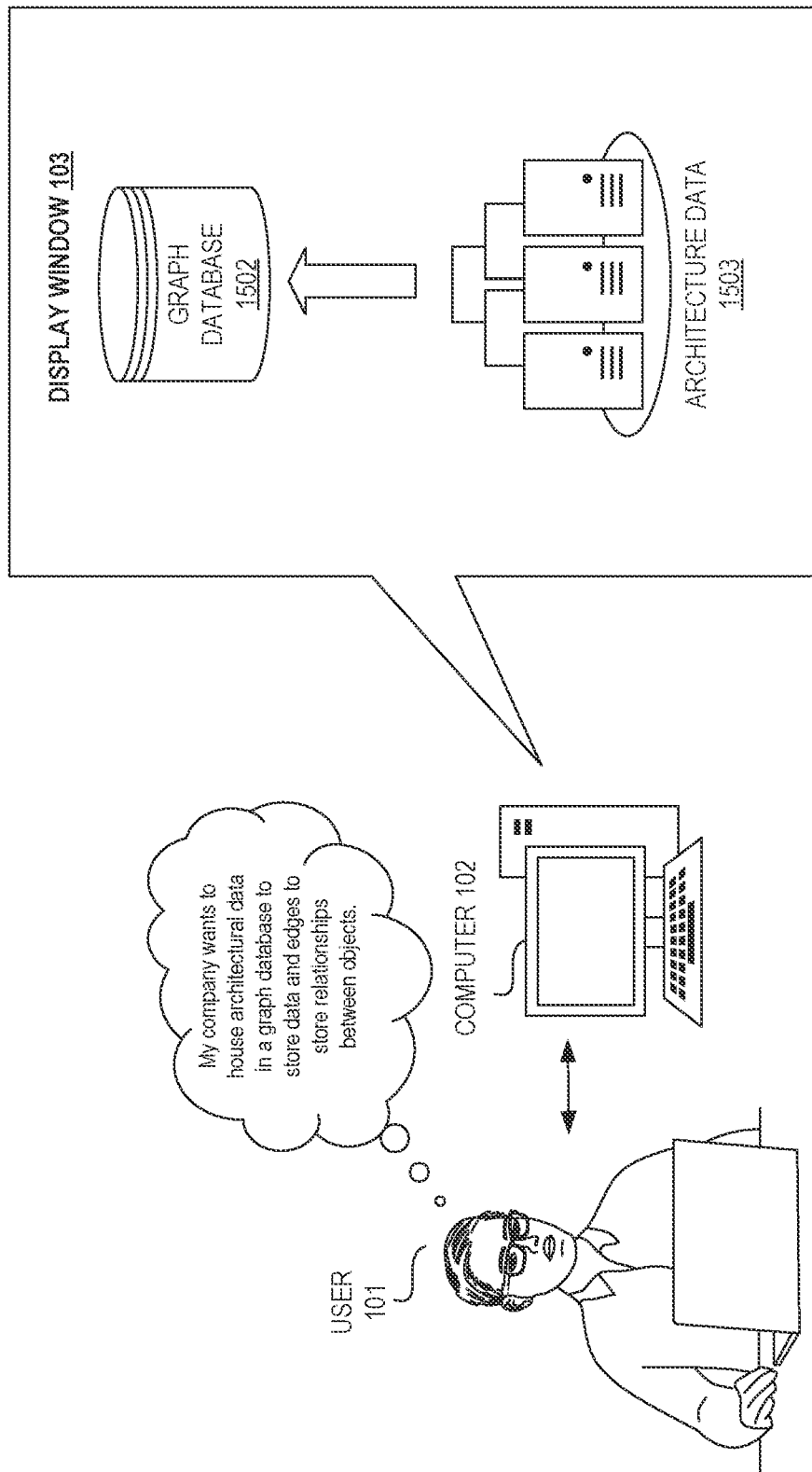
FIG. 15 depicts an exemplary illustration of a user using a computing device displaying a graph database housing architectural data, consistent with disclosed embodiments.

FIG. 15 depicts an exemplary illustration 1500 of user 101 using computer device 102, displaying a graph database 1502 housing architectural data 1503. FIG. 15 depicts an exemplary illustration of a diagram of graph database 1502 storing architectural data 1503. In the example, the user 101 uses computer 102 to view information in the graph database 1502 housing architectural data 1503. User 101 considers: "My company wants to house architectural data in a graph database to store data and edges to store relationships between objects." User 101 then opens display window 103, in which user 101 is presented with the graph database that is responsible for the formation of the working meta-model, as these components tie into the overall implementation of how the meta-model is enabled.

Figure 16:
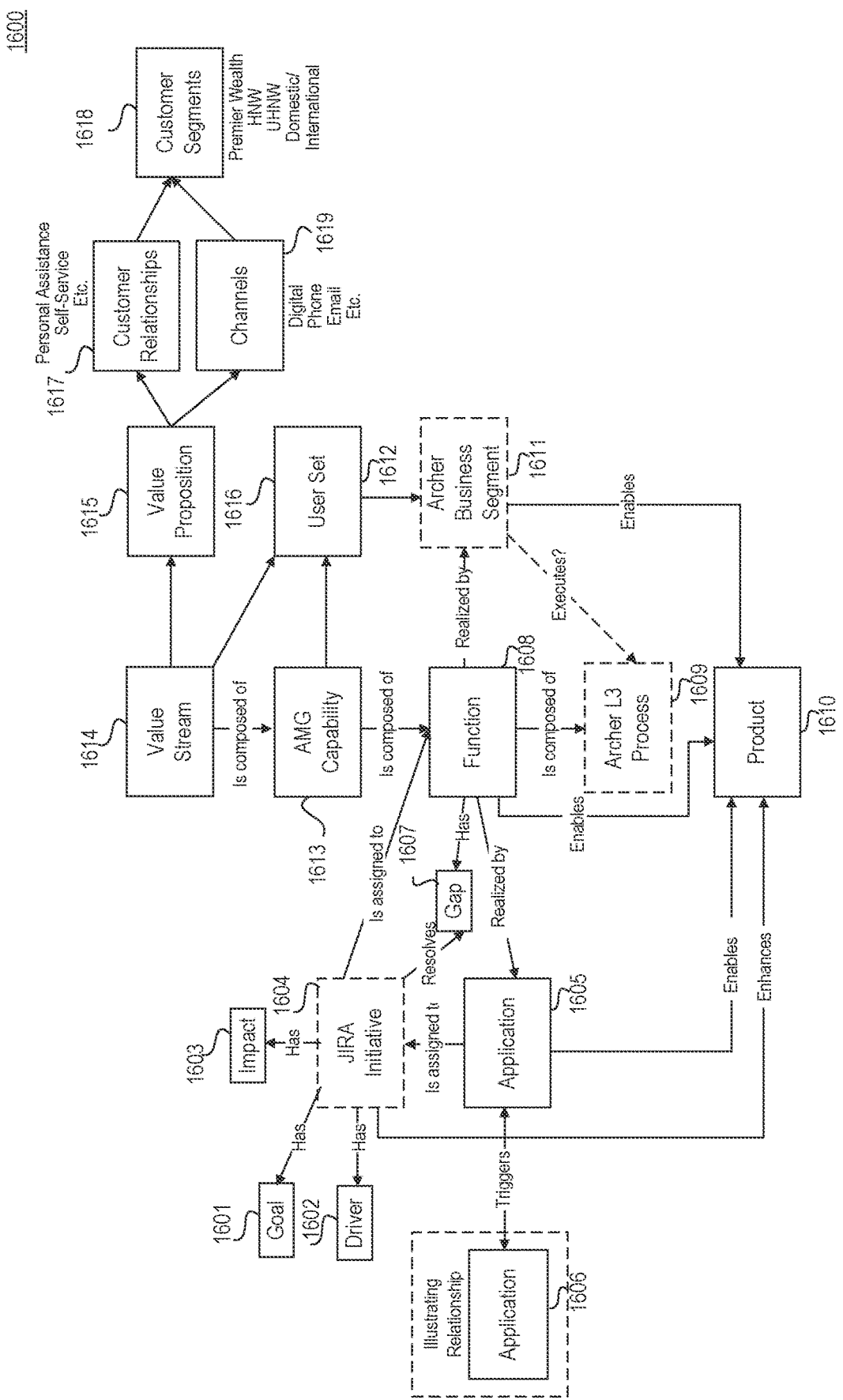
FIG. 16 depicts an exemplary illustration a working metamodel for an architectural graph database, consistent with disclosed embodiments.

FIG. 16 depicts an exemplary illustration of a working metamodel 1600 for an architectural graph database. Meta-Model 1600 includes an illustrated triggering relationship between an application 1606 and an application 1605. Application 1605 is assigned to a JIRA initiative 1604 which provides an impact on the graph databases' decisions. JIRA as used herein may refer to an application at the financial institution utilized to decompose units of technology delivery work and track that work for technology development teams. The architectural graph database harnesses that information for Technology planning purposes and considers it valuable when combined with elements representing business capabilities, functions, applications, etc. Application 1603 has an initial goal 1601 and an initial driver 1602 that is responsible for decomposing units of the organization. JIRA initiative 1604 enhances a product 1610, which enables application 1605 to be triggered. JIRA as used herein may refer to a software application that enables bug tracking and agile project management. JIRA initiative 1604 resolves a gap 1607, which could be potential faults with the data of the architectural graph database. JIRA initiative 1604 is assigned to a function 1608, which enables product 1610. Function 1608 is composed of a process 1609, which then executes a business segment process 1611 that is enabled by product 1610. Process 1609 is considered high-level "prime processes" at the financial institution and is attempting to categorize at a group of closely related elements. A capability 1613 is composed of function 1608.

Capability 1613 is inputted into a user set 1612 that is also inputted from a value stream 1614, that is composed of Capability 1613. Capability 1613 may also comprise Product Offerings, which captures all products and services offered by Capability 1613 to internal and external customers. When combined with other aspects of architecture data, it provides insight into things like "what applications are required to deliver a product or service," "what business capabilities and functions are necessary to deliver a product/service," etc. This allows users to understand the products that have a relationship to other architecture data components within the model.

User set 1612 may also be inputted into business segment process 1611, which is responsible for processing business segmentation within the organization. A value proposition 1615 consists of both customer relationships 1617, which involves options such as personal assistance and self-service, and implementation channels 1619, which include digital, phone, and email. These components results are inputted into customer segments 1618.

Reporting Insights

Disclosed embodiments may involve reporting architectural information corresponding to the graph database. Reporting as used herein may refer the documentation created to communicate essential information for the architectural graph database. In some embodiments, the architectural information includes application rationalizations related to a value stream, capability, or a function, as previously discussed in the disclosure. This may further comprise a backlog of desired insights comprising of at least one or more insights, the insights including: insights related to application rationalizations; insights related to data lineage; insights related to an organizational roadmap; insights related to a capability roadmap; and insights related to a heatmap.

Disclosed embodiments may involve generating the architectural information from one or more data domains, the architectural information being generated based on an architectural dataset within the graph database. An architectural dataset as used herein may refer to the set of data associated with the architectural graph-database, which includes the nodes that were previously described. In some embodiments, the nodes are represented as entities within the graph database. The entities, as used herein, are synonymous with the previously described "first-class entities."

Disclosed embodiments may involve distributing architectural information associated with the data domains, to report insights related to the architectural information via data visualization software. The architectural information can be distributed according to their respective properties, which allows for the nodes to be grouped according to the same properties. This can be done via data visualization software such as Tableau, which expresses data in a visualized format and helps users to tabularize different charts, graphs, maps, dashboards, and stories for visualizing and analyzing data, to help in making business decisions.

Figure 17:
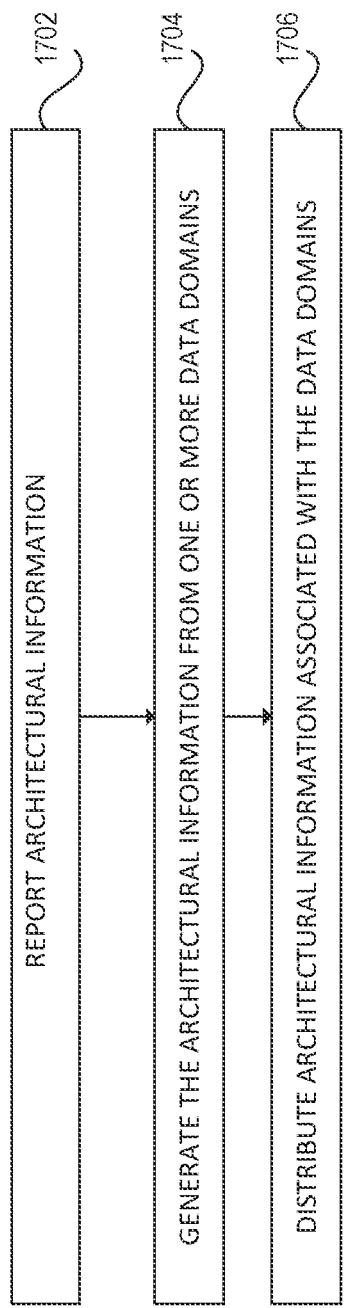
FIG. 17 depicts a flow chart for a method of providing a backlog of architectural information, consistent with disclosed embodiments.

FIG. 17 depicts a flow chart for a method 1700 of providing a backlog of architectural information. Method 1700 may include a step 1702 of reporting, as explained below with respect to FIG. 19, architectural information. Method 1700 may also include a step 1704 of generating, as explained below with respect to FIG. 19, the architectural information from one or more data domains, as for example. Method 1700 may also include a step 1706 of distributing, as explained below with respect to FIG. 19, architectural information associated with the data domains.

Figure 18A:
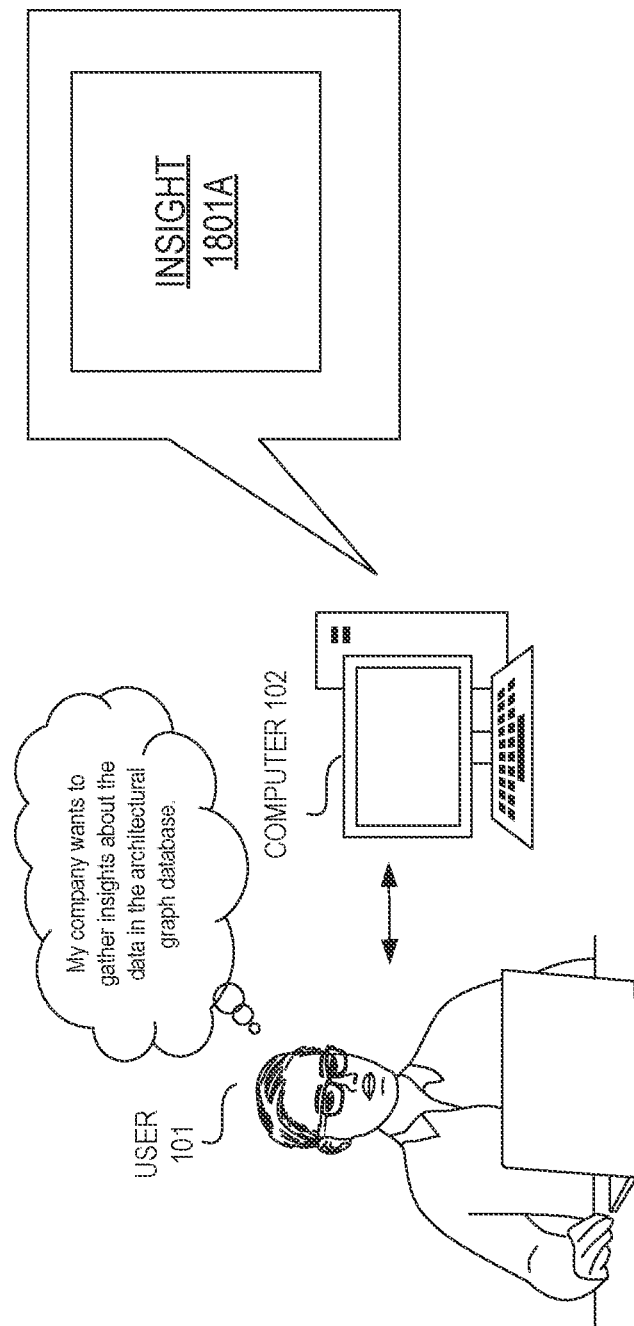
FIG. 18A depicts an exemplary illustration of a user using a computing device displaying an insight related to an architectural graph database, consistent with disclosed embodiments.

FIG. 18A depicts an exemplary illustration of a user using a computing device displaying an insight related to an architectural graph database. Insights, as used herein, may refer to values, such as the results of analysis of information, obtained through the use of analytics. User 101 considers: "My company wants to gather insights about the data in the architectural graph database." User 101 then uses computer 102 to view an insight 1801A for a graph database. User 101 will be able to understand how an individual or team gains from analyzing and interpreting data.

Figure 18B:
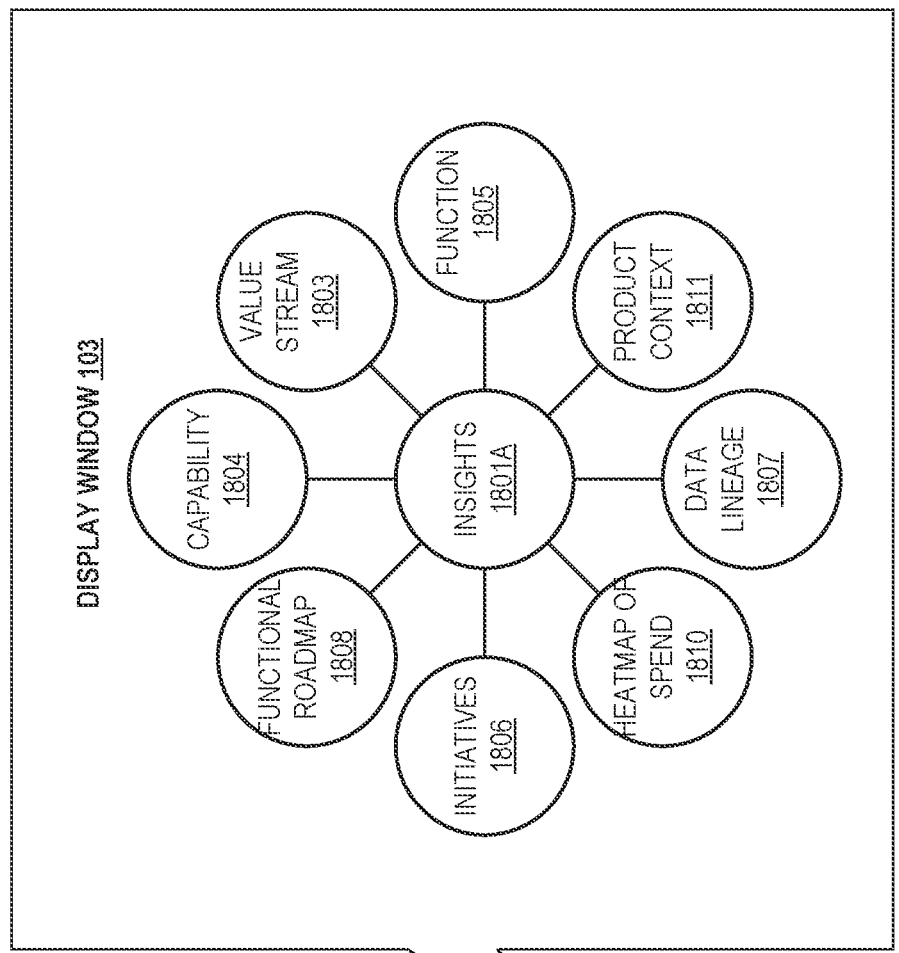
FIG. 18B depicts an exemplary illustration of the user in FIG. 18A using the computing device displaying several insights related to an architectural graph database, consistent with disclosed embodiments.
Figure 18B:
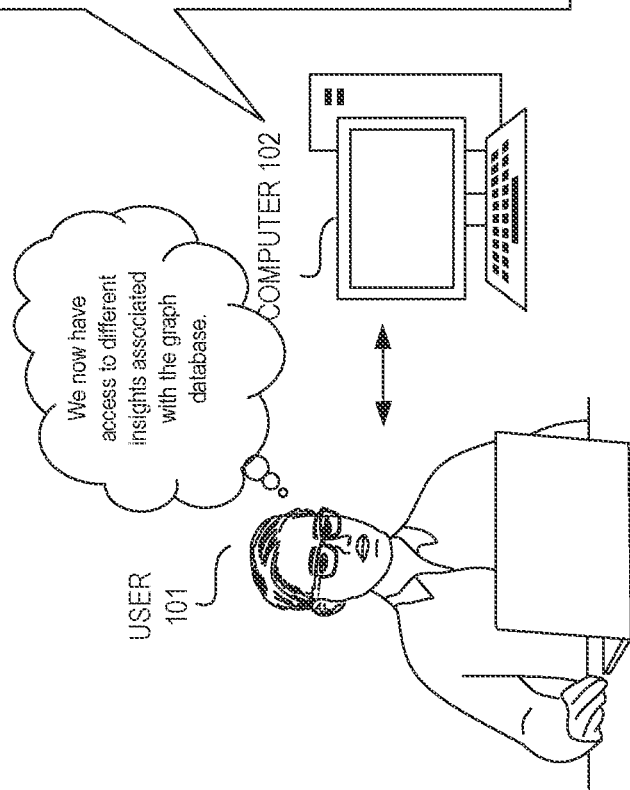

FIG. 18B depicts an exemplary illustration 1800 of user 101 using computer 102 displaying several insights related to the architectural graph database. User 101 considers: "We now have access to different insights associated with the graph database". User 101 then opens display window 103, in which user 101 is presented with one or more insights. The display on computer 102 presents user 101 with one or more insights that are reported for the architectural graph database. These may include Value Stream 1803, Capability 1804, Function 1805, Initiatives 1806, Data Lineage 1807, Heatmap of Spend 1810, and Product Context 1811. All of these insights are an extension of insights 1801A.

Figure 19:
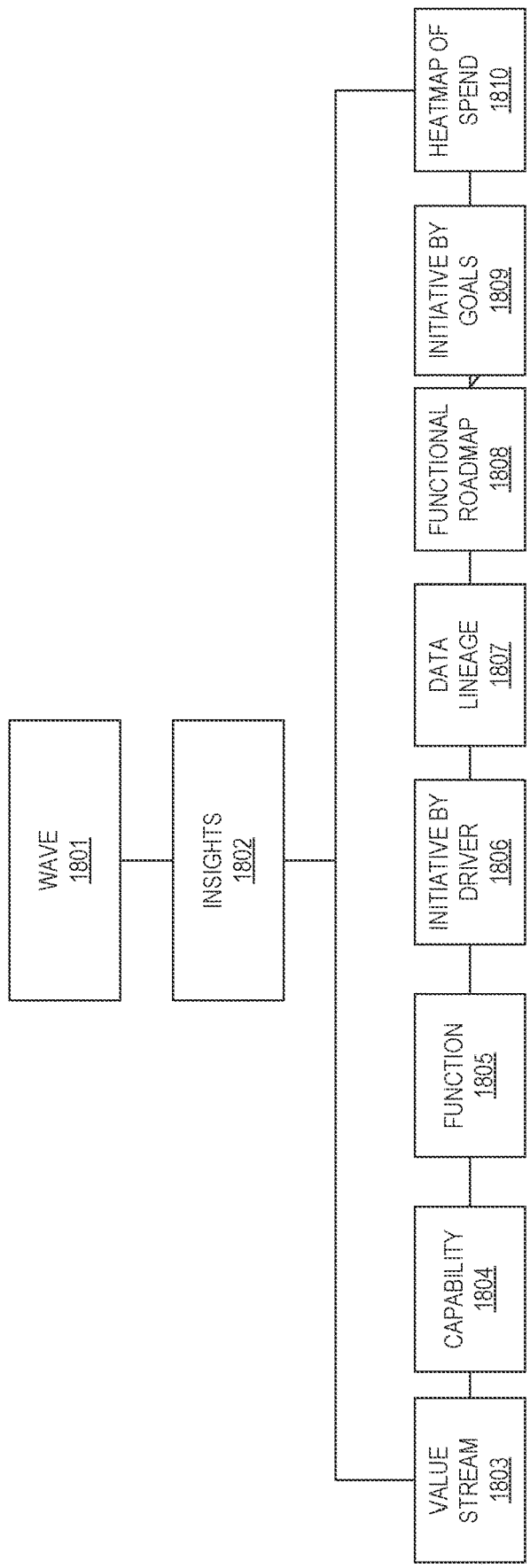
FIG. 19 depicts an exemplary diagram of one or more insights for an architectural graph database, consistent with disclosed embodiments.

FIG. 19 depicts an exemplary diagram 1900 of one or more insights for an architectural graph database. Diagram 1900 includes Value Stream 1803, Capability 1804, Function 1805, Initiative by Driver 1806, Data Lineage 1807, Organizational Roadmap 1808, Initiative by Goals 1809 and Heatmap of Spend 1810. These insights are under a branch of 1802, which are represented by a wave 1801. The backlog of desired insights only allows for each insight to be reported by one wave, i.e., wave 1801. In some embodiments, the architectural information includes cyclical phases of a commodity. A commodity as used herein may refer to any monetary asset. Value Stream 1803 represents the ability to understand the value each application has. Capability 1804 represents the ability to understand what business capabilities each application is realizing; Function 1805 represents the ability to understand what organizational ity each application is performing. Initiative By Driver 1806 represents the ability to visualize an aggregate view of all the initiatives by each driver. It also provides the ability to understand intent and why the business wants to invest in certain initiatives for the organization. Data Lineage 1807 represents the ability to understand what applications are sending what data domain to other applications to perform a business organizational ity. In some embodiments, the architectural information includes data lineage for identifying data distribution. This allows for the enablement of duplicative data distribution. In some embodiments, the data lineage includes one or more data hops. This represents the ability to understand multiple data hops. A data hop as used herein is a computer networking term that refers to the number of routers that a packet (a portion of data) passes through from its source to its destination. Organizational Roadmap 1808 represents the ability to understand the intended work associated with one or more business functions, cross-product, and cross-business unit. Initiatives By Goal represents the ability to visualize an aggregate view of one or more initiatives by each goal such as cost reduction and risk. Heatmap of Spend 1810 represents the ability to understand active and planned work in an amount of dollars, which is either allocated or proposed for each business function and capability. These desired insights are derived utilizing the data within the architecture graph database. It provides an understanding of the way that applications are integrated, and what data is distributed utilizing those integrations.

Framework Architecture

Disclosed embodiments may involve identifying architectural information according to a metamodel utilized by an architectural framework, the architectural framework classifying elements of a modeling language and including at least one or more layers. Elements as used herein may refer to information that has unique subcategories such as data items of distinct value. Layers as used herein may refer to the structure or organization of data within the database, which represent various levels of processes within the architectural model. In some embodiments, identifying the architectural information includes decomposing for expressing and categorizing information into one or more domains using an open architecture framework (TOGAF). The organization's information can be decomposed into four domains which are: (1) Business, (2) Data, (3) Application and (4) Technology. In some embodiments, the architectural framework uses a modeling language to express information about the one or more data domains, the modeling language including individual layers for structured context that are modeled. The modeling language enables the analysis and visualization of business structures. In some embodiments, the modeling language provides structured context within each of the one or more data domains to categorize and display information associated with each of the domains. Structured context as used herein may refer to data that is stored, indexed, and properly processed in an organization. In some embodiments, the structural context includes classification of the elements of the modeling language, based on layer-independent characteristics. The structured context includes the data schema, tables, relationships, or constraints that accurately defines how the data can be structured within the architectural graph database.

In some embodiments, the one or more layers define a structure of the elements of the modeling language and their relationships. The architectural framework divides the enterprise architecture into a business, application, and technology layer. In each layer, three aspects are considered: active elements, an internal structure, and elements that define use or communicate information. A layer as used herein may refer to the structure or organization of data within the database, which represent various levels of processes within the architectural model. This can include a business layer about business processes, services, functions, and events of business units. The business layer offers products and services to external customers, which are realized in the organization by business processes performed by business actors and roles.

An application layer is about software applications that support the components in the business with application services. A technology layer deals with the hardware and communication infrastructure to support the Application Layer. This layer offers infrastructural services needed to run applications, realized by computer and communication hardware and system software.

Each of these main layers can be divided in sub-layers. For example, in the Business layer, the primary business processes realizing the products of a company can make use of a layer of secondary business processes. In application layer, the end-user applications can make use of generic services offered by supporting applications. On top of the Business layer, a separate Environment layer may be added, modeling external customers that make use of the services of the organization (although these may also be considered part of the Business layer).

Disclosed embodiments may involve providing a structured context for the architectural framework, the structured context including the elements of the modeling language for classifying and representing the architectural information within each of one or more data domains. Elements as used herein may refer to components of the data structures that are present within the architectural graph database. In some embodiments, the elements of the modeling language are basic units in the architectural metamodel for defining and describing parts of the architectural framework. This can include fields, columns, attributes, and data values, which all define the structure and contents of the data that can be stored within the graph database.

Disclosed embodiments may involve analyzing the identified architectural information, the architectural information including the at least one or more layers for modeling object information. Object information as used herein may refer to data associated with the object within the architectural graph database. These objects can also be viewed as the previously described nodes. These objects are first-class entities that comprise both the attributes and behavior of the nodes. Furthermore, object information can include pertinent details regarding the attributes of the object along with their relationships of these objects within the architectural graph database. This can also further include metadata concerning these objects, such as their object types, classes, or inheritance hierarchies.

Disclosed embodiments may involve utilizing a modeling language to express the architectural information about the one or more data domains. The modeling language expresses the architectural information for each data domains. The modeling language complements the architectural framework, to provide structured context within each architecture domain, which enables the model to categorize and represent information within each data domain.

Disclosed embodiments may involve generating the architectural information categorized according to the metamodel, to organize the architectural information for the architectural framework into the one or more data domains. In some embodiments, the metamodel is a collection of concepts, each of the concepts being represented as either one of the element or relationship.

Figure 20:
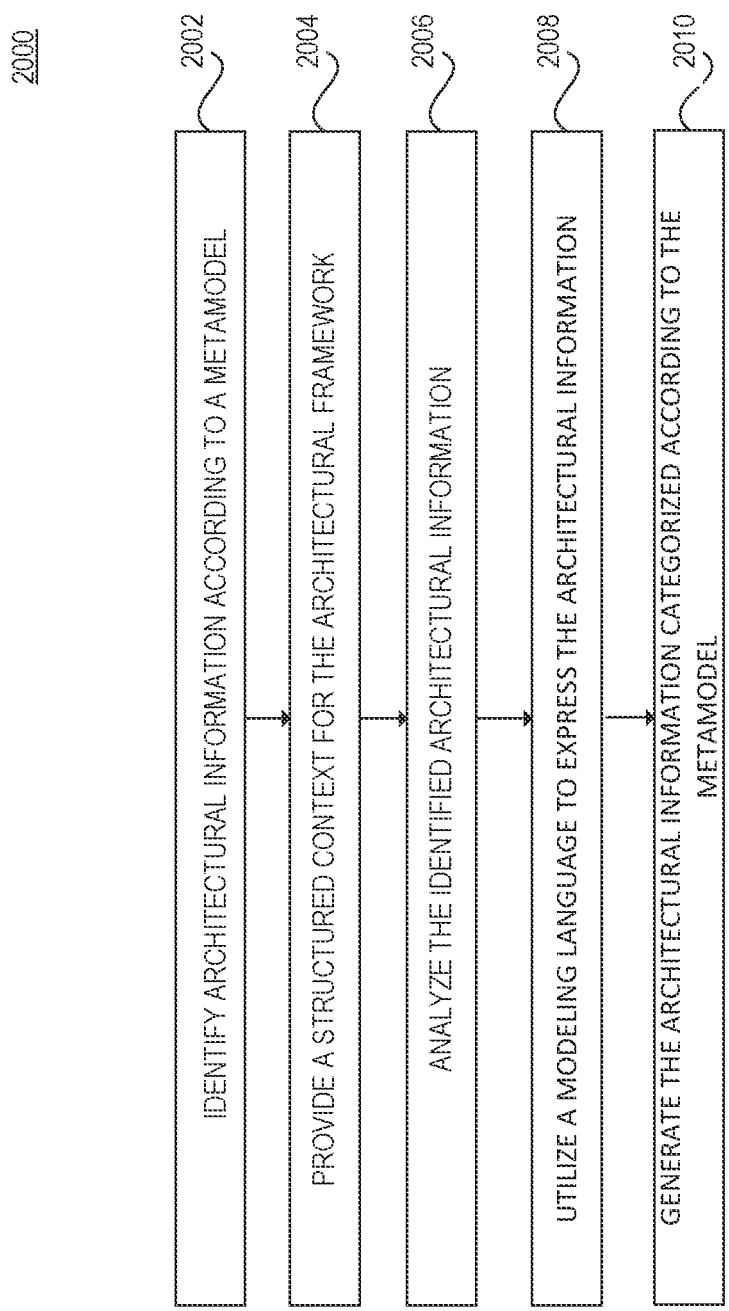
FIG. 20 depicts a flow chart for a method of organizing architectural information, consistent with disclosed embodiments.

FIG. 20 depicts a flow chart for a method 2000 of organizing architectural information. Method 2000 may include a step 2002 of identifying, as explained above with respect to FIG. 16, architectural information according to a metamodel. Method 2000 may also include a step 2004 of providing, as explained above with respect to FIG. 16, a structured context for the architectural framework, as for example. Method 2000 may also include a step 2006 of analyzing, as explained above with respect to FIG. 16, the identified architectural information. Method 2000 may also include a step 2008 of utilizing, as explained above with respect to FIG. 16, utilize a modeling language to express the architectural information. Method 2000 may further include a step 2010 of generating, as explained above with respect to FIG. 16, the architectural information categorized according to the metamodel.

FIG. 21A depicts an exemplary illustration of a user using a computing device displaying an architectural framework including enterprise information. Enterprise information as used herein may refer to data associated with a business organization, such as a financial institution, which provides details surrounding the organization's business processes. User 101 considers: "My company wants to structure the enterprise information using an architectural framework". User 101 then uses computer 102 to view enterprise information 2108 for a graph database. User 101 can gain an understanding of enterprise information 2108 that can be used to improve the function of the organization's business processes, in which this can include handling large volumes of data. Enterprise information 2108 can provide a single system that is central to the financial institution or organization to ensure that data can be shared across all levels of the business organization.

Figure 21B:
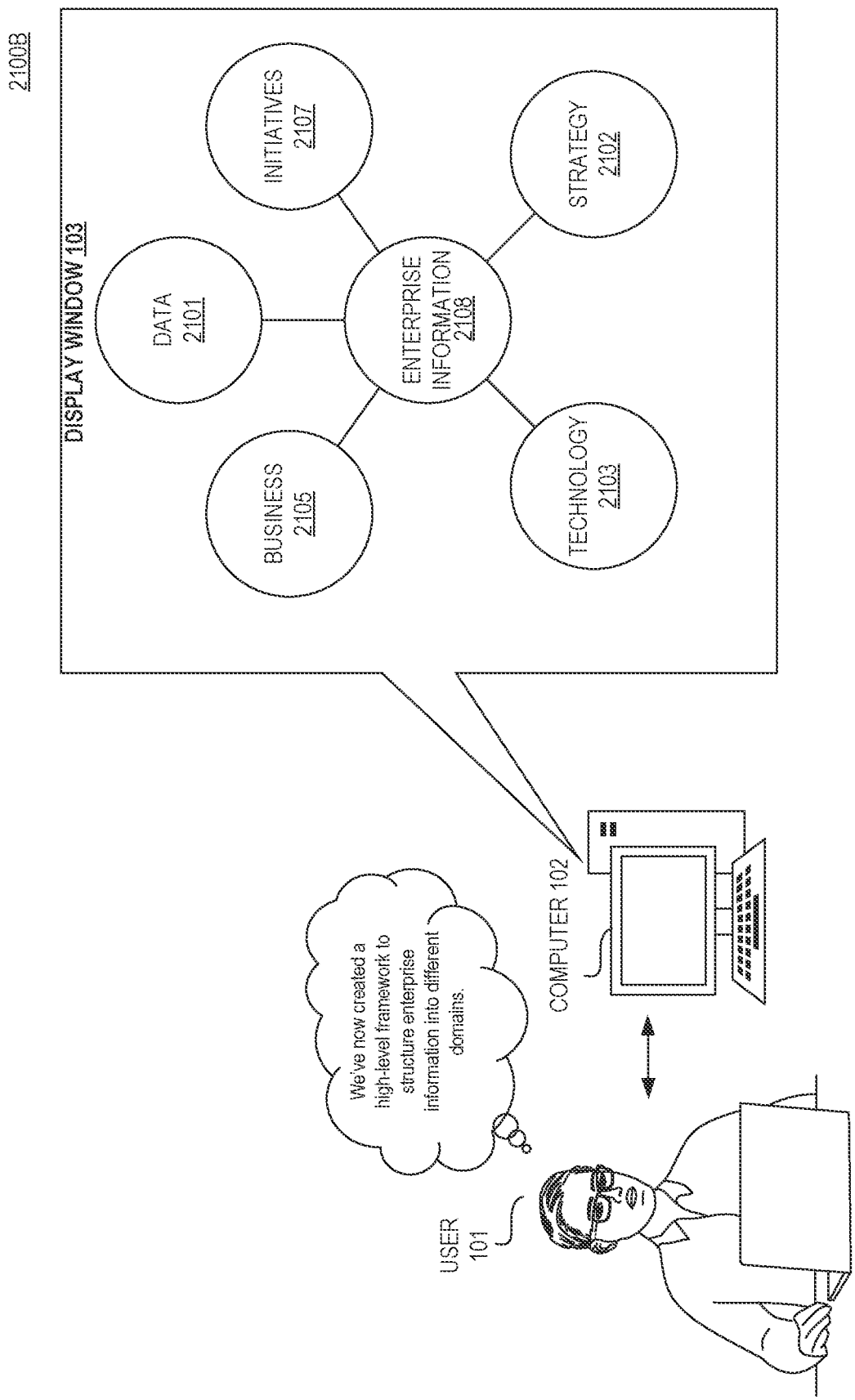
FIG. 21B depicts an exemplary illustration of the user in FIG. 21A using the computing device displaying an architectural framework, and its associated domains, consistent with disclosed embodiments.

FIG. 21B depicts an exemplary illustration 2100 of a user 101 using computer 102 to display a diagram of an architectural framework. User 101 considers: "We've now created a high-level framework to structure enterprise information into different domains". User 101 then opens display window 103, in which user 101 is presented with one or more elements of the architectural framework that are used to categorize the several types of data associated with each domain. This may include Data 2101, Strategy 2102, Technology 2103, Business 2105, Initiatives 2107, which are all centered around a main architectural element, enterprise information 2108 for organizing architecture information. The technical steps associated within these domains include utilizing the meta-model across the organization. It federates aspects of the meta-model for ownership and maintenance (owned and managed by MIS (i.e., Technology), EDS (Enterprise Data Team), and LOB (each individual business unit). The purpose of the architecture meta-model is to bring these historically disparate datasets together to produce valuable insights. An MIS as used herein may refer to an information system used for decision-making, and for the analysis, and visualization of information in an organization. An enterprise data team as used herein may refer to an analytic team that is responsible for managing structured and unstructured data information for an organization. A line of business as used herein may refer to product or service a business offers.

Comprehensive Data Management

Disclosed embodiments may involve grouping according to the meta-model, architectural datasets together to structure architectural information into a common format. Grouping as used herein may refer to arranging similar elements into similar groups. A common format as used herein may refer to a synchronous grouping of elements into a table. A relational database is typically organized into tables that includes rows and columns. The columns consist of fields or attributes that primarily define the types of data that can be stored in the table. The rows consist of records, in which each row represents a specific entry related to the entity of the table that is represented.

Disclosed embodiments may involve establishing an architectural domain for grouping the architectural information in a plurality of layers. The architectural domains, as described, are grouped according to the information described with reference to FIG. 19.

Disclosed embodiments may involve organizing the meta-model to establish possession of information in the plurality of layers. In some embodiments, the architectural domain includes possessing an information system for an application domain and a data domain. The information system as used herein may refer to a structured system for storing, processing, and distributing data within the organization to support organizational goals.

Disclosed embodiments may involve providing architectural data corresponding to each data domain for each of the plurality of layers from one or more data sources. This aforementioned plurality of layers are described above with respect to FIG. 19.

Figure 22:
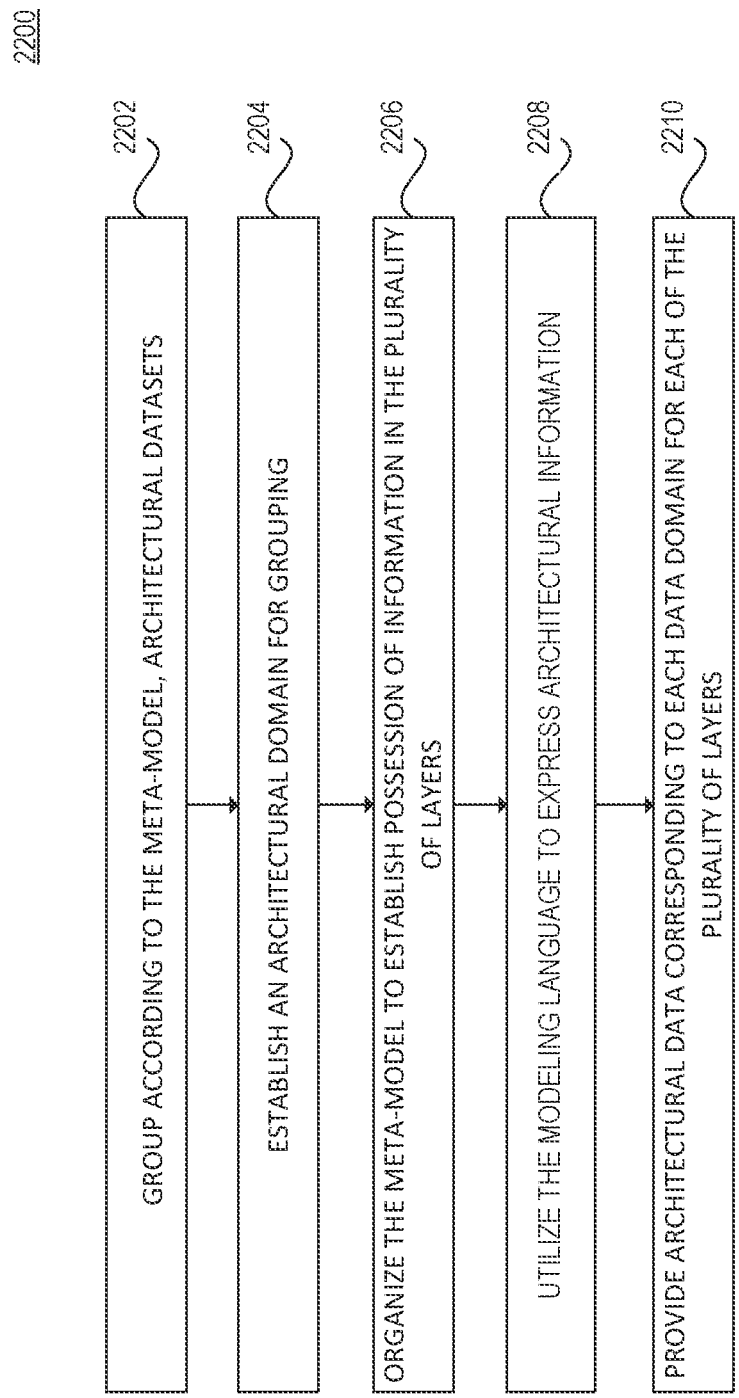
FIG. 22 depicts a flow chart for a method of grouping architectural information within a plurality of layers for common formatting in a database, consistent with disclosed embodiments.

FIG. 22 depicts a flow chart for a method 2200 of grouping architectural information within a plurality of layers for common formatting in a database, consistent with disclosed embodiments. Method 2200 may include a step 2202 of grouping, as explained above with respect to FIG. 21, according to the meta-model, architectural datasets. Method 2200 may also include a step 2204 of establishing, as explained above with respect to FIG. 21, an architectural domain for grouping, as for example. Method 2200 may also include a step 2206 of organizing, as explained above with respect to FIG. 21, the meta-model to establish possession of information in the plurality of layers. Method 2200 may also include a step 2208 of utilizing, as explained above with respect to FIG. 21, the modeling language to express the architectural information. Method 2200 may further include a step 2210 of providing, as explained above with respect to FIG. 21, architectural data corresponding to each data domain for each of the plurality of layers.

FIG. 23 depicts an exemplary illustration of a table 2300, for organizing architectural information for common formatting, consistent with disclosed embodiments. Table 2300 includes strategy 2301, business 2302, data 2303, application 2304 and technology 2305. Table 2300 enables an overarching structure or tooling system to pull data into a common format. Strategy 2301 and business 2302, both allow for grouping lines of businesses that come from a data source, consisting of disparate documentation. In some embodiments, one or more data sources includes disparate information corresponding to a collection of architectural data that are not similar to each other. This disparate documentation may include PowerPoint, Excel, or Word. In some embodiments, the architectural domain includes information that is managed by an information system. Data 2303 is MIS managed (Management Information Systems) along with application 2304, which collectively manages data within the architectural graph database. In some embodiments, the architectural domain includes the data sources for the architectural data of data catalogs via an electronic data system (EDS). Data 2303's data source comes from data documentation via the EDS (Electronic Data System). In some embodiments, the one or more data sources include one or more of an ARIS data source; a ServiceNow data source; or a Troux data source. Application 2304's data source for retrieving data may come from the ARIS application, ServiceNow application, Troux application or through disparate documentation. Technology 2305 allows for ET&S (Earnings, Taxes and Services), which is data source retrieves information from either an ARIS application or Troux application.

Figure 24:
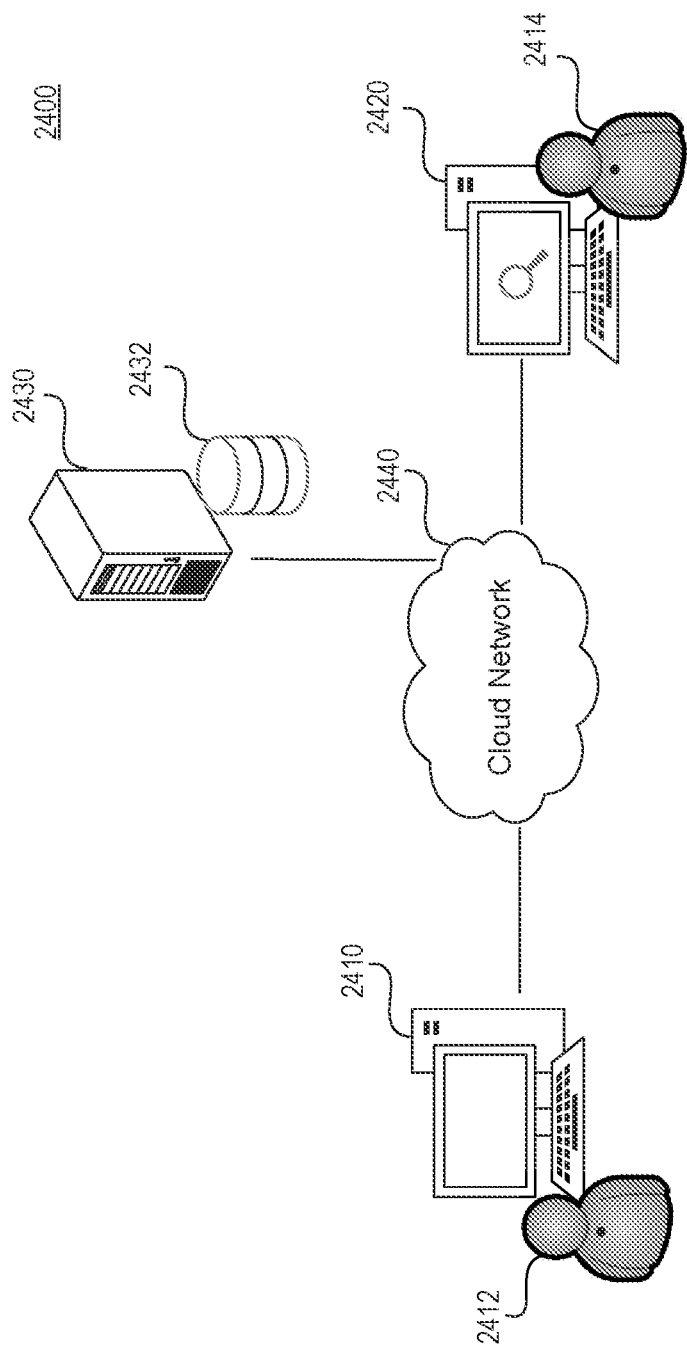
FIG. 24 depicts an exemplary system environment for an Architecture Graph Database, consistent with disclosed embodiments, consistent with disclosed embodiments.

FIG. 24 depicts an exemplary system environment 2400 for the Architecture Graph Database, consistent with disclosed embodiments. System environment 2400 may include one or more financial institution endpoint devices 2410, one or more user endpoint devices 2420, and one or more computing devices 2430. System environment 2400 may represent a system or network environment in which activities of a user 2412 on financial institution endpoint device 2410 are recorded and stored on computing device 2430. A user 2412 may then view these recorded activities on user endpoint device 2420. The recording, transmission, and storage of the recorded user activity may be performed in a secure manner, such that only financial endpoint device 2410 and user endpoint device 2420 may have access to the recorded activity.

The various components of system 2400 may communicate over a network 2440. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, communications may take place across two or more of these forms of networks and protocols. While system environment 2400 is shown as a network-based environment, it is understood that in some embodiments, one or more aspects of the disclosed systems and methods may also be used in a localized system, with one or more of the components communicating directly with each other.

User endpoint device 2420 may be configured such that user 2412 may access a protected navigation location through a browser or other software executing on user endpoint device 2420. As used herein, a protected navigation location may be any network location deemed sensitive. As used herein, sensitive may refer to confidential information that requires protection from unauthorized access.

User endpoint device 2420 may include any form of computer-based device or entity through which user 2412 may access a protected navigation location. For example, user endpoint device 2420 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of accessing web pages or other network locations. In some embodiments, user endpoint device 2420 may be a virtual machine (e.g., based on AWS™, Azure™, IBM Cloud™, etc.), container instance (e.g., Docker™ container, Java™ container, Windows Server™ container, etc.), or other virtualized instance. Using the disclosed methods, activity of user 2412 through user endpoint device 2420 may be monitored and recorded by a browser extension executing on user endpoint device 2420.

User endpoint device 2420 may communicate with computing device 2430 through network 2440. For example, user endpoint device 2420 may transmit recorded activity of user 2412 to computing device 2430. Computing device 2430 may include any form of remote computing device configured to receive, store, and transmit data. For example, computing device 2430 may be a server configured to store files accessible through a network (e.g., a web server, application server, virtualized server, etc.). Computing device 2430 may be implemented as a Software as a Service (SaaS) platform through which software for auditing recorded user activity may be provided to an organization as a web-based service. In some embodiments, computing device 2430 may be a decoupled Python server. Financial institution endpoint device 2410 may similarly communicate with computing device 2430 through network 2440. User endpoint device 2420 and financial institution endpoint device 2410 may include some or all of components in FIG. 25, further discussed below.

Figure 25:
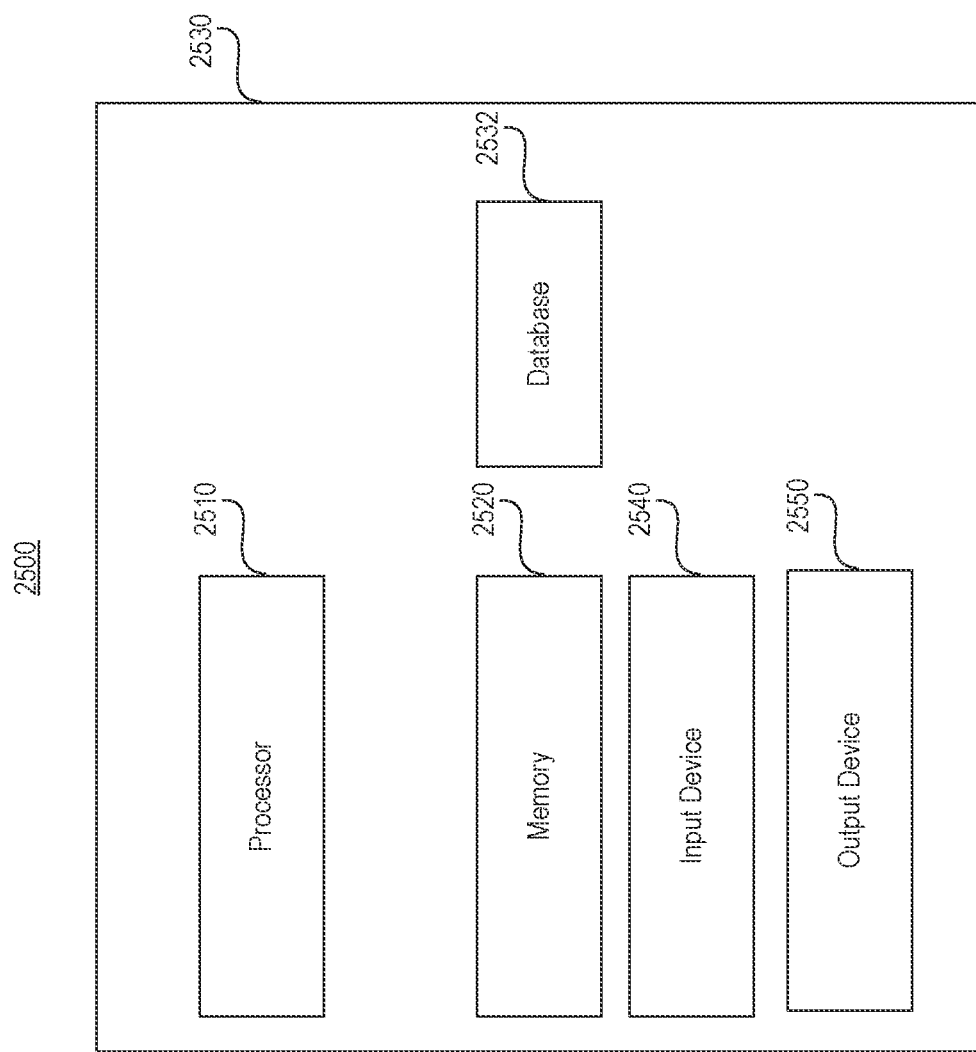
FIG. 25 depicts a block diagram showing an exemplary computing device, consistent with disclosed embodiments.

FIG. 25 depicts a block diagram showing an exemplary computational device, consistent with disclosed embodiments. For example, server 2500 may be an example implementation of computing device 2500. Server 2500 may include one or more dedicated processors and/or memories. For example, server 2500 may include a processor (or multiple processors) 2510, and a memory (or multiple memories) 2520.

Processor 2510 may take the form of, but is not limited to, a microprocessor, embedded processor, or the like, or may be integrated in a system on a chip (SoC). Furthermore, according to some embodiments, processor 2510 may be from the family of processors manufactured by Intel®, AMD®, Qualcomm®, Apple®, NVIDIA®, or the like. The processor 2510 may also be based on the ARM architecture, a mobile processor, or a graphics processing unit, etc. The disclosed embodiments are not limited to any type of processor configured in server 2430.

Memory 2520 may include one or more storage devices configured to store instructions used by the processor 2510 to perform functions related to computing device 2430. The disclosed embodiments are not limited to software programs or devices configured to perform dedicated tasks. For example, memory 2520 may store a single program, such as a user-level application, which performs the functions associated with the disclosed embodiments or may comprise multiple software programs. Additionally, processor 2510 may, in some embodiments, execute one or more programs (or portions thereof) remotely located from server 2500. Furthermore, memory 2520 may include one or more storage devices configured to store data for use by the programs. Memory 2520 may include, but is not limited to, a hard drive, a solid-state drive, a CD-ROM drive, a peripheral storage device (e.g., an external hard drive, a USB drive, etc.), a network drive, a cloud storage device, or any other storage device.

In some embodiments, server 2500 may include an input device 2540. Server 2500 may include one or more digital and/or analog devices that allow communication with other machines and devices, such as other components of system 2400. Computing device 2430 may include one or more input/output devices. Input device 2540 may be configured to receive input from the user, e.g., the user of computing device 2430, and one or more components of server 2500 may perform one or more functions in response to the input received. In some embodiments, input device 2540 may include an interface displayed on a touchscreen (e.g., an output device 2550). Output device 2550 may include a screen for displaying communications to a user. For example, output device 2550 may include a display configured to display the information relating to the transaction. Server 2500 may include other components known in the art for interacting with a user. Output device 2550 may also include one or more digital and/or analog devices that allow a user to interact with system 2400, such as touch sensitive area, keyboard, buttons, or microphones.

In some embodiments, server 2500 may include a database 2532. Database 2532 may be included on a volatile or non-volatile, magnetic, semiconductor, tape, optical, removable, non-removable, or other type of storage device or tangible or non-transitory computer-readable medium. Database 2532 may also be part of server 2500 or separate from server 2500. When database 2532 is not part of server 2500, server 2500 may exchange data with database 2532 via a communication link. Database 2532 may include one or more memory devices that store data and instructions used to perform one or more features of the disclosed embodiments. Database 2532 may include any suitable databases, ranging from small databases hosted on a workstation to large databases distributed among data centers. Database 2532 may also include any combination of one or more databases controlled by memory controller devices (e.g., server(s), etc.) or software. For example, database 2532 may include document management systems, Microsoft SQL™ databases, SharePoint™ databases, Oracle™ databases, Sybase™ databases, other relational databases, or non-relational databases, such as mongo and others.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described herein can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

It should be appreciated that the above described methods and apparatus may be varied in many ways, including omitting, or adding steps, changing the order of steps and the type of devices used. It should be appreciated that unique features may be combined in diverse ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other organizational units described in the present disclosure can be implemented by hardware, or software, or a combination of hardware and software. One of ordinary skill in the art will also understand that multiple ones of the above-described modules/units can be combined as one module or unit, and each of the above described modules/units can be further divided into a plurality of sub-modules or sub-units.

The block diagrams in the figures illustrate the architecture, organizational entity, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the organizational entity involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive.

Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A computer-system for maintaining a relational data model for storage in a database, comprising:
   a storage device that stores instructions; and
   at least one processor that executes the instructions to:
      generate, using a machine learning model, a data analysis algorithm trained to predict relationships in a data domain according to an architectural framework, wherein the architectural framework includes four levels: a business level, an application level, a data level and a technology level;
      logically segregating, using the data analysis algorithm, each data domain based on the architectural framework, wherein the logical segregation includes organizing data within each data domain into one of the four levels of the architectural framework;
      access a graph database that includes nodes and edges as a data model for representing data objects of the data domain according to the architectural framework, the nodes being configured to store first-class entities and the edges being configured to store relationships between the first-class entities;
      store individual data objects of the data domain within the database according to relationships between the first-class entities in the data domain, the relationships containing architectural properties of the architectural framework, for an instance of querying, the querying including searching for applications within the data domain;
      query the data objects using a modeling language for the database;
      apply the data analysis algorithm to identify patterns in the graph database; and
      draw the identified graph patterns on the graph database.

2. The system of claim 1, wherein the nodes include a set of data in the graph database for the data representation model of the graph database.

3. The system of claim 1, wherein the relational meta-model dataset requires one or more disparate data tables to express the graph databases' capabilities in a modeled instance.

4. The system of claim 1, wherein the graph database classifies relationships for the data objects as the first-class entities.

5. The system of claim 1, wherein the graph database includes the relationships between data points that contain properties for the first-class entities.

6. The system of claim 1, wherein the graph database includes querying data containing the relationships.

7. The system of claim 1, wherein the data analysis algorithm includes: a tangible similarity algorithm and a tangible centrality algorithm.

8. The system of claim 7, wherein the tangible centrality algorithm includes determining unique ones of the nodes within the graph database.

9. The system of claim 7, wherein the tangible similarity algorithm includes computing similar pairs of the nodes based on their properties or properties of neighboring ones of the nodes.

10. A computer-implemented method for maintaining a relational data model for storage in a database, the method comprising the following operations performed by at least one processor:
    at least one processor that executes the instructions to:
       generating, using a machine learning model, a data analysis algorithm trained to predict relationships in a data domain according to an architectural framework, wherein the architectural framework includes four levels: a business level, an application level, a data level and a technology level,
       logically segregating, using the data analysis algorithm, each data domain based on the architectural framework, wherein the logical segregation includes organizing data within each data domain into one of the four levels of the architectural framework;
       accessing, a graph database that includes nodes and edges as a data model for representing data objects of the data domain according to the architectural framework, the nodes being configured to store first-class entities and the edges being configured to store relationships between the first-class entities;
       storing, individual data objects of the data domain within the database according to relationships between the first-class entities in the data domain, the relationships containing architectural properties of the architectural framework, for an instance of querying, the querying including searching for applications within the data domain;
       querying, the data objects using a modeling language for the database;
       applying, the data analysis algorithm to identify patterns in the graph database; and
       drawing the identified graph patterns on the graph database.

11. The system of claim 10, wherein the nodes include the set of data in the graph database for the data representation model of the graph database.

12. The system of claim 10, wherein the relational meta-model dataset requires one or more disparate data tables to express the graph databases' capabilities in a modeled instance.

13. The system of claim 10, wherein the graph database of the set of data involves classifying relationships as the first-class entities.

14. The system of claim 10, wherein the graph database includes the relationships between data points that contain properties for the first-class entities.

15. The system of claim 10, wherein the graph database includes querying data containing the relationships.

16. The system of claim 10, wherein the data analysis algorithm includes: a tangible similarity algorithm and a tangible centrality algorithm.

17. The system of claim 16, wherein the tangible centrality algorithm includes determining unique ones of the nodes within the graph database.

18. The system of claim 16, wherein the tangible similarity algorithm includes computing similar pairs of the nodes based on their properties or properties of neighboring ones of the nodes.

* * * * *